United States Patent
Jang et al.

(10) Patent No.: US 11,282,061 B2
(45) Date of Patent: Mar. 22, 2022

(54) ELECTRONIC DEVICE AND PAYMENT METHOD USING SAME

(71) Applicant: Samsung Electronics Co., Ltd., Suwon-si (KR)

(72) Inventors: Wooseok Jang, Yongin-si (KR); Kyungdong Kim, Suwon-si (KR); Kyungduk Kim, Seoul (KR); Sangchul Baek, Seoul (KR); Dongho Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 487 days.

(21) Appl. No.: 16/477,034

(22) PCT Filed: Jan. 31, 2018

(86) PCT No.: PCT/KR2018/001357
§ 371 (c)(1),
(2) Date: Jul. 10, 2019

(87) PCT Pub. No.: WO2018/143676
PCT Pub. Date: Aug. 9, 2018

(65) Prior Publication Data
US 2021/0216992 A1    Jul. 15, 2021

(30) Foreign Application Priority Data
Feb. 6, 2017    (KR) .................. 10-2017-0016187

(51) Int. Cl.
*G06Q 20/32*    (2012.01)
*G06Q 20/38*    (2012.01)
(Continued)

(52) U.S. Cl.
CPC ....... *G06Q 20/325* (2013.01); *G06F 3/04842* (2013.01); *G06Q 20/12* (2013.01);
(Continued)

(58) Field of Classification Search
None
See application file for complete search history.

(56) References Cited

U.S. PATENT DOCUMENTS 8,699,674 B2 *    4/2014    Bouzid .................. G06F 8/38
                                                    379/88.01
9,047,600 B2 *    6/2015    Zhou .................. G06Q 20/3823
(Continued)

FOREIGN PATENT DOCUMENTS

KR    10-0673032 B1    1/2007
KR    10-2012-0064830 A    6/2012
(Continued)

OTHER PUBLICATIONS

Schettler, "Mobile banking more mainstream," Press-Citizen [Iowa City, Iowa] Jan. 28, 2011, p. A11. (Year: 2011).*
(Continued)

*Primary Examiner* — Nicholas D Rosen
(74) *Attorney, Agent, or Firm* — Jefferson IP Law, LLP

(57) ABSTRACT

The present invention relates to an electronic device and a payment method using the same. The electronic device comprises at least a processor, memory, and touch screen display, the memory storing a call application including a first user interface, a payment application, and instructions which cause the processor to: display the first user interface of the call application on the touch screen display; receive a phone number or indication of the phone number through the first user interface from a user; request a call connection to the phone number; receive data associated with to the phone number from a first server while the request is being made, the data including a currently available item; display the item on an interface while the request is being made; display an input button associated with the payment appli-
(Continued)

cation; receive an input selecting the input button; and execute the payment application.

14 Claims, 19 Drawing Sheets

(51) Int. Cl.
*G06Q 20/16* (2012.01)
*G06Q 20/12* (2012.01)
*G06Q 20/40* (2012.01)
*G06Q 30/06* (2012.01)
*G06F 3/0484* (2013.01)
*G06F 3/0488* (2013.01)
*H04W 4/35* (2018.01)
*H04M 1/72403* (2021.01)
*G06F 3/04842* (2022.01)

(52) U.S. Cl.
CPC ......... *G06Q 20/326* (2020.05); *G06Q 20/382* (2013.01); *G06Q 20/4014* (2013.01); *G06Q 30/0641* (2013.01); *H04M 1/72403* (2021.01); *H04W 4/35* (2018.02); *G06F 3/0488* (2013.01); *G06Q 20/16* (2013.01); *G06Q 30/0635* (2013.01)

(56) References Cited

U.S. PATENT DOCUMENTS

| | | | | |
|---|---|---|---|---|
| 9,235,831 | B2* | 1/2016 | Rolf | G06Q 20/02 |
| 9,953,322 | B2* | 4/2018 | Lee | G06Q 20/16 |
| 2011/0119156 | A1* | 5/2011 | Hwang | G06Q 20/3278 |
| | | | | 705/26.41 |
| 2013/0184611 | A1* | 7/2013 | Nichols | A61B 5/1116 |
| | | | | 600/587 |
| 2013/0272511 | A1* | 10/2013 | Bouzid | G06F 8/38 |
| | | | | 379/88.01 |
| 2014/0222676 | A1 | 8/2014 | Lee et al. | |
| 2014/0330656 | A1* | 11/2014 | Zhou | H04W 12/06 |
| | | | | 705/16 |
| 2014/0358779 | A1* | 12/2014 | El-Sakka | G06Q 20/16 |
| | | | | 705/44 |
| 2015/0170123 | A1* | 6/2015 | Hakanpaa | G06Q 20/12 |
| | | | | 705/18 |
| 2015/0278773 | A1* | 10/2015 | Rolf | G06Q 20/4037 |
| | | | | 705/39 |
| 2016/0260346 | A1* | 9/2016 | Lafrinere | G09B 23/28 |
| 2016/0358077 | A1* | 12/2016 | Benson | G06F 16/245 |

FOREIGN PATENT DOCUMENTS

| | | | |
|---|---|---|---|
| KR | 10-2013-0040463 A | 4/2013 | |
| KR | 10-2014-0091984 A | 7/2014 | |
| KR | 10-2015-0123982 A | 11/2015 | |
| KR | 10-2015-0125760 A | 11/2015 | |
| KR | 10-2016-0031577 A | 3/2016 | |
| WO | WO-2016092331 A * | 6/2016 | ............ H04M 15/00 |

OTHER PUBLICATIONS

Anon., Carrier Billing Now Available for Protext Mobility's AmberWatch[R] SafeText,' Business Wire, Apr. 28, 2011. (Year: 2011).*

* cited by examiner

ELECTRONIC DEVICE AND PAYMENT METHOD USING SAME

TECHNICAL FIELD

The disclosure relates to an electronic device and a payment method using the same.

BACKGROUND ART

Recently, users who shop from home rather than going out to do their shopping have increased in light of the ability to reduce time and costs. For example, a user may shop conveniently from home through TV home shopping, Internet shopping, and mobile shopping. Particularly, the TV home shopping is frequently used by users since the users can feel vicarious satisfaction while viewing models who actually eat food or wear clothes. If the user desires to purchase a product through the TV home shopping, the user may use a call connection with a representative or an ARS.

DETAILED DESCRIPTION OF THE INVENTION

Technical Problem

However, if the user purchases a product through a call connection with a representative or through an ARS, the user will be inconvenienced in that the user should directly input payment means information (for example, an account number, an amount to be transferred, and a card number) or give the payment means information to the representative in order to perform payment after ordering the product. Accordingly, the user may give up ordering the product. Further, if the payment means information is directly input by the user or transferred to the representative by voice, the payment means information may be leaked to other people and thus has a security risk.

Solution to Problem

According to various embodiments of the disclosure, when ordering or paying for a product with an electronic device using a phone number of a service provider (for example, a home shopping service provider, a shopping mall service provider, or a utility bill issuing institution), the electronic device may display information on the product and a user interface including a button associated with a payment service for paying for the product.

According to various embodiments of the disclosure, the electronic device may provide a method of conveniently performing a function of ordering and paying for a product through a button included in a user interface.

According to various embodiments of the disclosure, the electronic device may provide a high-security payment function through a button associated with a payment service in order to purchase a product.

According to various embodiments of the disclosure, the electronic device may provide a product order payment system through which a service provider performing a payment service can easily process registration and payment for a product.

According to various embodiments of the disclosure, the electronic device may display the first user interface of the call application on the touch screen display, receive a phone number or an indication of the phone number through the first user interface from a user, make a request for a call connection to the phone number through the wireless communication circuit, receive data associated with the phone number from a first server through the wireless communication circuit while the request for the call connection is being made, the data including a currently available item for a selected period, display the item on the first user interface while the request for the call connection is being made, display an input button associated with the payment application on the first user interface while the request for the call connection is being made, receive an input for selecting the input button through the first user interface, and execute the payment application.

In accordance with an aspect of the disclosure, an electronic device includes: a housing; a touch screen display exposed through a portion of the housing; at least one wireless communication circuit positioned inside the housing; a processor positioned inside the housing and electrically connected to the touch screen display and the wireless communication circuit; and a memory positioned inside the housing, electrically connected to the processor, wherein the memory stores a call application including a first user interface and a payment application including a second user interface, wherein the memory stores instructions that, when executed cause the processor to display the first user interface of the call application on the touch screen display, receive a phone number or an indication of the phone number through the first user interface from a user, make a request for a call connection to the phone number through the wireless communication circuit, receive data associated with the phone number from a first server through the wireless communication circuit while the request for the call connection is being made, the data including a currently available item for a selected period, display the item on the first user interface while the request for the call connection is being made, display an input button associated with the payment application on the first user interface while the request for the call connection is being made, receive an input for selecting the input button through the first user interface, and execute the payment application.

In accordance with another aspect of the disclosure, an electronic device includes: a housing; a touch screen display exposed through a portion of the housing; at least one wireless communication circuit positioned inside the housing; a processor positioned inside the housing and electrically connected to the touch screen display and the wireless communication circuit; and a memory positioned inside the housing, electrically connected to the processor, wherein the memory stores a call application including a first user interface and a payment application including a second user interface, wherein the memory stores instructions that, when executed, cause the processor to display the first user interface of the call application on the touch screen display, receive an input of a phone number through the first user interface, display the item, an input button associated with the payment application, and at least one object related to a method for ordering the item on the first user interface, and if an input for selecting the input button is received through the first user interface, execute the payment application.

In accordance with another aspect of the disclosure, a method of performing payment by an electronic device includes: displaying a first user interface of a call application on a touch screen display; receiving a phone number or an indication of the phone number through the first user interface; making a request for a call connection to the phone number; receiving data associated with the phone number including a currently available item for a selected period from a first server while the request for the call connection is being made; displaying the item and an input button associated with the payment application on the first user interface while the request for the call connection is being made; and if an input for selecting the input button in received through the first user interface, executing the payment application.

In accordance with another aspect of the disclosure, a method of performing payment by an electronic device includes: displaying the first user interface of the call application on the touch screen display; receiving an input of a phone number through the first user interface; displaying the item, an input button associated with the payment application, and at least one object related to a method for ordering the item; and if an input for selecting the input button is received through the first user interface, executing the payment application.

Advantageous Effects of Invention

According to various embodiments of the disclosure, the electronic device may prevent the user from giving up ordering the product due to conventional inconvenience in ordering and making payment for the product.

According to various embodiments of the disclosure, the electronic device may provide information on a product and a user interface including a button associated with a payment service for ordering or making payment for the product and thus the user may conveniently perform a function of ordering and paying for the product.

According to various embodiments of the disclosure, the electronic device may provide a function of purchasing or making payment for the product through a button associated with a payment service. Accordingly, the user may perform an easy and high-security payment function.

According to various embodiments of the disclosure, the electronic device may allow registration and purchase of different products with different prices according to time using the same phone number, so that anyone can easily register a product and use a payment service. Therefore, various embodiments of the disclosure may expand the base of ordering, making payment, and distribution using a phone call.

MODE FOR CARRYING OUT THE INVENTION

Figure 1:
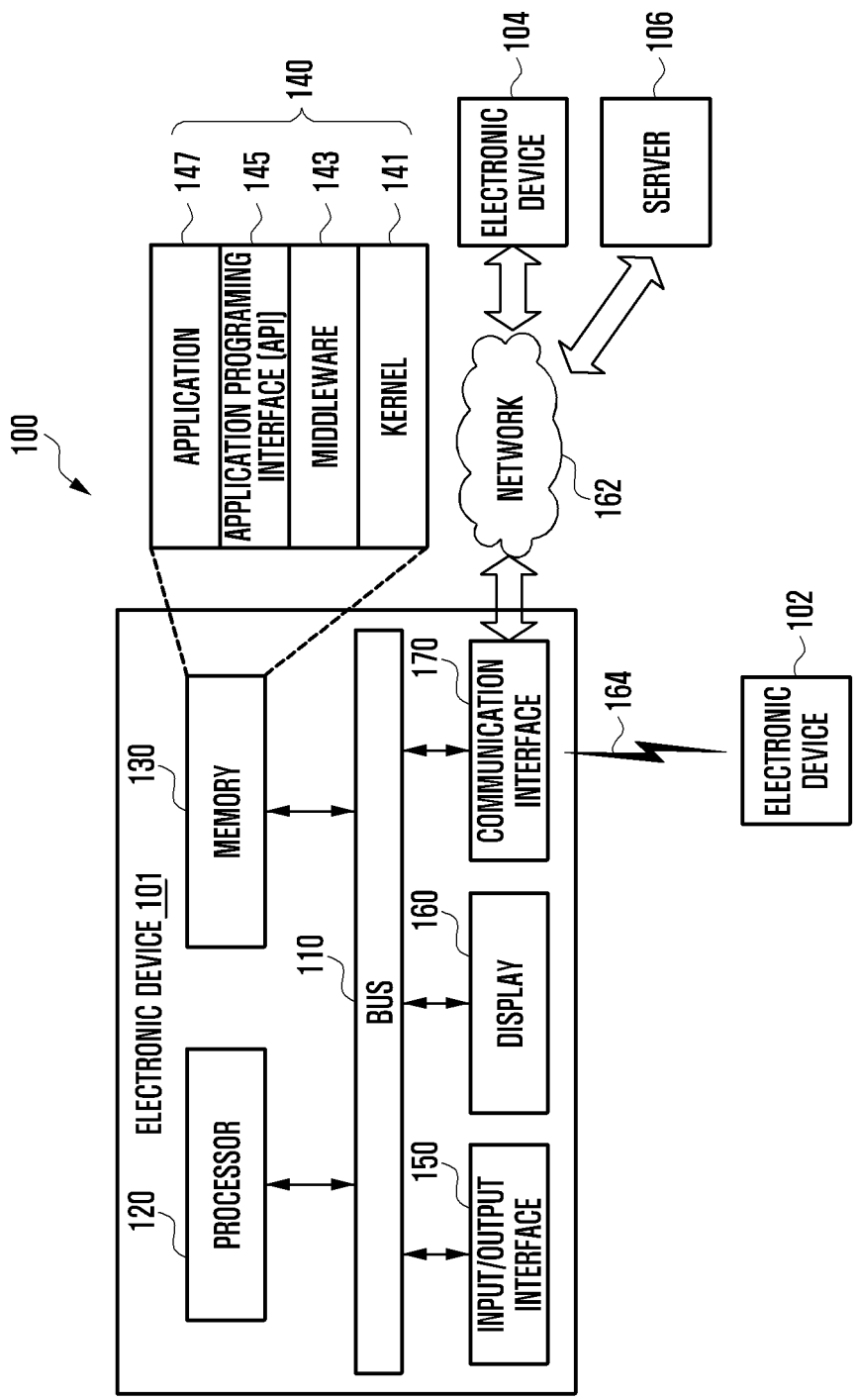
FIG. 1 illustrates an electronic device within a network environment according to various embodiments of the disclosure.

Hereinafter, the present disclosure will be described with reference to the accompanying drawings. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components may be designated by the same reference numeral.

The terms "include" or "may include" which may be used in describing various embodiments of the present disclosure refers to the existence of a corresponding disclosed function, operation or component which can be used in various embodiments of the present disclosure and does not limit one or more additional functions, operations, or components.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1," "2," "first," or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component (for example, a first component) is "coupled to" or "connected to" another component (for example, a second component), the component may be directly coupled to the another component, or coupled to the another component through a new component (for example, a third component)t. In contrast, when it is stated that a component (for example, a first component) is "directly coupled to" or "directly connected to" another component (for example, a second component), a new component (for example, a third component) does not exist between the component and another component.

According to embodiments of the present disclosure, when it is stated that a component is "directly coupled to" or "directly connected to" another component, a new component does not exist between the component and another component. In the present disclosure, the expression "configured (or set) to do" may be used interchangeably with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor, such as an embedded processor or a generic-purpose processor, such as a central processing unit (CPU) or application processor that may execute one or more software programs stored in a memory device to perform corresponding functions.

The terms used in describing various embodiments of the present disclosure are only examples for describing a specific embodiment but do not limit the various embodiments of the present disclosure. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

According to embodiments of the present disclosure, examples of the electronic device may include a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), an MP3 player, a medical device, a camera, and a wearable device. Examples of the wearable device may include an accessory type device (such as, watch, ring, bracelet, ankle bracelet, necklace, glasses, contact lens, and head-mounted device (HMD), a textile or clothes type device such as electronic clothes, a body-attached type such as a skin pad and tattoo, and a bio-implemented type.

According to some embodiments, the electronic device may be a smart home appliance. The smart home appliance may include at least one of a television (TV), a digital video disc (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to an embodiment, examples of the electronic device may include a medical device (such as portable medical sensors (including glucometer, heart rate sensor, tonometer, and body thermometer), magnetic resonance angiography (MRA) device, magnetic resonance imaging (MRI) device, computed tomography (CT) device, camcorder, and microwave scanner), a navigation device, a global navigation satellite system (GNSS), an event data recorder (EDR), a flight data recorder (FDR), an automotive infotainment device, marine electronic equipment (such as marine navigation system and gyro compass), aviation electronics (avionics), an automotive head unit, an industrial or household robot, an automated teller machine (ATM), a point of sale (POS) terminal, and an Internet-of-Things (IoT) device, such as an electric light bulb, sensor, sprinkler system, fire alarm system, temperature controller, street lamp, toaster, fitness equipment, hot water tank, heater, and boiler.

According to an embodiment of the present disclosure, examples of the electronic device may include furniture, a building/structure, a part of a vehicle, an electronic board, an electronic signature receiving device, a projector, and a sensor (such as water, electricity, gas, and electric wave meters). The electronic device may be flexible or a combination of at least two of the aforementioned devices, but the electronic device is not limited to the aforementioned devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

FIG. 1 is a block diagram showing a network environment according to various embodiments of the present disclosure.

Referring to FIG. 1, an electronic device 101, in a network environment 100, includes a bus 110, a processor 120, a memory 130, an input/output interface 150, a display 160, and a communication interface 170. According to some embodiment, the electronic device 101 may omit at least one of the components or further include another component. The bus 110 may be a circuit connecting the above described components and transmitting communication, such as a control message between the above described components. The processor 120 may include one or more of a central processing unit (CPU), application processor (AP) or communication processor (CP). For example, the processor 120 may control at least one component of the electronic device 101 and/or execute calculation relating to communication or data processing.

The memory 130 may include volatile and/or non-volatile memory. For example, the memory 130 may store command or data relating to at least one component of the electronic device 101, and may store software and/or program 140. For example, the program 140 may include a kernel 141, middleware 143, an application programming interface (API) 145, and/or applications 147. At least one portion of the kernel 141, the middleware 143 and the API 145 may be defined as an operating system (OS). The kernel 141 controls or manages system resources, such as the bus 110, the processor 120, or the memory 130, used for executing an operation or function implemented by the remaining other program, for example, the middleware 143, the API 145, or the applications 147. The kernel 141 provides an interface for accessing individual components of the electronic device 101 from the middleware 143, the API 145, or the applications 147 to control or manage the components.

The middleware 143 performs a relay function of allowing the API 145 or the applications 147 to communicate with the kernel 141 to exchange data. Further, in operation requests received from the applications 147, the middleware 143 performs a control for the operation requests, such as scheduling or load balancing, by using a method of assigning a priority, by which the system resources of the electronic device 101 may be used, to the applications 147. The API 145 is an interface by which the applications 147 may control a function provided by the kernel 141 or the middleware 143 and includes, for example, at least one interface or function for a file control, a window control, image processing, or a character control. The input/output interface 150 may be interface to transmit command or data inputted by a user or another external device to another component(s) of the electronic device 101. The input/output interface 150 may output the command or data received from the other component(s) of the electronic device 101 to the user or the other external device.

The display 160 may include, for example, liquid crystal display (LCD), light emitting diode (LED), organic LED (OLED), or micro electro mechanical system (MEMS) display, or electronic paper display. The display 160 may display, for example, various contents (text, image, video, icon, or symbol, and so on) to a user. The display 160 may include a touch screen, and receive touch, gesture, approaching, or hovering input using a part of body of the user. The communication interface 170 may set communication of the electronic device 101 and an external device, such as a first external device 102, a second external device 104, or a server 106. For example, the communication interface 170 may be connected with the network 162 through wireless communication or wire communication and communicate with the external device, such as, a second external device 104 or server 106).

Wireless communication may use, as cellular communication protocol, at least one of long-term evolution (LTE), LTE advanced (LTE-A), code division multiple access (CDMA), wideband CDMA (WCDMA), universal mobile telecommunications system (UMTS), wireless broadband (WiBro), and global system for mobile communications (GSM) for example. A short-range communication 164 may include, for example, at least one of Wi-Fi, Bluetooth, near field communication (NFC), magnetic secure transmission or near field magnetic data stripe transmission (MST), and global navigation satellite system (GNSS). The GNSS may include at least one of, for example, a global positioning system (GPS), a global navigation satellite system (Glonass), a Beidou navigation satellite system (Beidou), and Galileo (European global satellite-based navigation system). Hereinafter, GPS may be interchangeably used with GNSS in the present disclosure. Wired communication may include, for example, at least one of universal serial bus (USB), high definition multimedia interface (HDMI), recommended standard-232 (RS-232)), and plain old telephone service (POTS). The network 162 may include a telecommunication network, for example, at least one of a computer network, such as local area network (LAN) or wide area network (WAN), the Internet, and a telephone network.

Each of the first external device 102 and the second external device 104 may be the same as or a different type of device than the electronic device 101. According to some embodiment, the server 106 may include one or more group of servers. At least one portion of executions executed by the electronic device may be performed by one or more electronic devices, such as external electronic device 102, 104, or server 106. When the electronic device 101 should perform a function or service automatically, the electronic device 101 may request performing of at least one function to the other device. For the above, cloud computing technology, distributed computing technology, or client-server computing technology may be used, for example.

Figure 2:
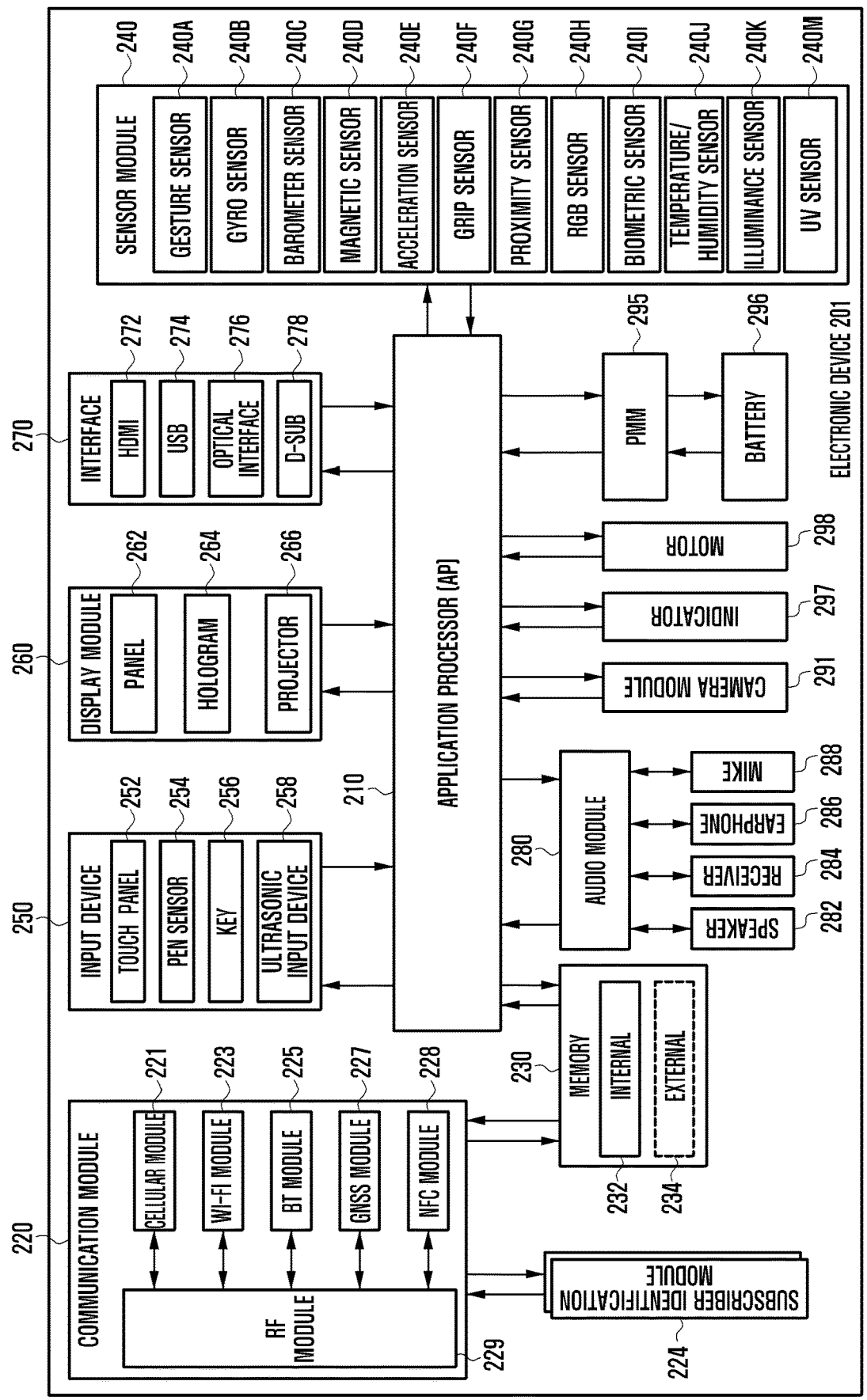
FIG. 2 is a block diagram of an electronic device according to various embodiments of the disclosure.

FIG. 2 is a block diagram of an electronic device according to various embodiments of the present disclosure.

Referring to FIG. 2, an electronic device 201 may configure all or a part of the electronic device 101 illustrated in FIG. 1. The electronic device 201 includes one or more APs 210, a communication module 220, a subscriber identification module (SIM) card 224, a memory 230, a sensor module 240, an input device 250, a display module 260, an interface 270, an audio module 280, a camera module 291, a power management module 295, a battery 296, an indicator 297, and a motor 298. The AP 210 operates an OS or an application program so as to control a plurality of hardware or software component elements connected to the AP 210 and execute various data processing and calculations including multimedia data. The AP 210 may be implemented by a system on chip (SoC), for example. According to an embodiment, the processor 210 may further include a graphics processing unit (GPU) and/or image signal processor. The AP 210 may include at least one portion of components illustrated in FIG. 2, such as a cellular module 221. The AP 210 may load command or data received from at least one of another component, such as a non-volatile memory, and store various data in the non-volatile memory.

The communication module 220 may include same or similar components with the communication interface 170 of FIG. 1, and may include the cellular module 221, a Wi-Fi module 223, a BT module 225, a GPS module 227, an NFC module 228, and a radio frequency (RF) module 229. The cellular module 221 provides a voice, a call, a video call, a short message service (SMS), or an Internet service through a communication network, such as LTE, LTE-A, CDMA, WCDMA, UMTS, WiBro, or GSM. The cellular module 221 may distinguish and authenticate electronic devices within a communication network by using a SIM card 224. According to an embodiment, the cellular module 221 performs at least some of the functions which may be provided by the AP 210. For example, the cellular module 221 may perform at least some of the multimedia control functions, and may include a CP. Each of the Wi-Fi module 223, the BT module 225, the GPS module 227, and the NFC module 228 may include, for example, a processor for processing data transmitted/received through the corresponding module. Although the cellular module 221, the Wi-Fi module 223, the BT module 225, the GPS module 227, and the NFC module 228 are at least two of the cellular module 221, the Wi-Fi module 223, the BT module 225, the GPS module 227, and the NFC module 228 may be included in one integrated chip (IC) or one IC package according to one embodiment. For example, at least the CP corresponding to the cellular module 221 and the Wi-Fi processor corresponding to the Wi-Fi module 223 of the processors corresponding to the cellular module 221, the Wi-Fi module 223, the BT module 225, the GPS module 227, and the NFC module 228 may be implemented by one Sock The RF module 229 transmits/receives data, such as an RF signal and may include, for example, a transceiver, a power amp module (PAM), a frequency filter, and a low noise amplifier (LNA). The RF module 229 may further include a component for transmitting/receiving electronic waves over a free air space in wireless communication, for example, a conductor or a conducting wire. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module according to one embodiment. The SIM card 224 includes a SIM and may be inserted into a slot formed in a particular portion of the electronic device. The SIM card 224 includes unique identification information, such as an integrated circuit card identifier (ICCID) or subscriber information, such as an international mobile subscriber identity (IMSI).

The memory 230 may include an internal memory 232 or an external memory 234. The internal memory 232 may include, for example, at least one of a volatile memory, such as, a random access memory (RAM), a dynamic RAM (DRAM), a static RAM (SRAM), and a synchronous dynamic RAM (SDRAM) and a non-volatile Memory, such as, a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory. According to an embodiment, the internal memory 232 may be a solid state drive (SSD). The external memory 234 may further include a flash drive, such as a compact flash (CF), a secure digital (SD), a micro-SD, a mini-SD, an extreme digital (xD), or a memory stick. The external memory 234 may be functionally connected to the electronic device 201 through various interfaces. According to an embodiment, the electronic device 201 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H, such as, red, green, and blue (RGB) sensor) 240H, a biometric sensor 240I, a temperature/humidity sensor 240J, an illumination (light) sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and a fingerprint sensor. The sensor module 240 may further include a control circuit for controlling one or more sensors included in the sensor module 240. In embodiments, the electronic device 201 is capable of including a processor, configured as part of the processor 210 or a separate component, for controlling the sensor module 240. In this case, while the processor 210 is operating in a sleep mode, the processor is capable of controlling the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 may recognize proximity as well as a direct touch. The touch panel 252 may further include a tactile layer that provides a tactile reaction to the user. The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 may detect an acoustic wave by a microphone 288 of the electronic device 201 through an input means generating an ultrasonic signal to identify data and may perform wireless recognition.

The display 260 includes a panel 262, a hologram device 264, and a projector 266. The panel 262 may be, for example, an LCD or an active matrix OLED (AM-OLED). The panel 262 may be implemented to be flexible, transparent, or wearable and may be configured by the touch panel 252 and one module. The hologram device 264 displays a stereoscopic image in the air by using interference of light. The projector 266 projects light on a screen to display an image. For example, the screen may be located inside or outside the electronic device 201. According to an embodiment, the display 260 may further include a control circuit for controlling the panel 262, the hologram device 264, and the projector 266. The interface 270 includes, for example, a HDMI 272, an USB 274, an optical interface 276, and a D-subminiature (D-sub) 278, and may be included in, for example, the communication interface 170 illustrated in FIG. 1. Additionally or alternatively, the interface 270 may include, for example, a mobile high-definition link (MHL) interface, an SD card/multi-media card (MMC), or an infrared data association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, or the microphone 288. The camera module 291 may photograph a still image and a video, and may include one or more image sensors, such as a front sensor or a back sensor, an image signal processor (ISP) or a flash, such as an LED or a xenon lamp. The power managing module 295 manages power of the electronic device 201. The power managing module 295 may include, for example, a power management integrated circuit (PMIC), a charger IC, or a battery gauge. The PMIC may be mounted to, for example, an integrated circuit or a SoC semiconductor. A charging method may be divided into wired and wireless methods. The charger IC charges a battery and prevents over-voltage or over-current from flowing from a charger. According to an embodiment, the charger IC includes a charger IC for at least one of the wired charging method and the wireless charging method. The wireless charging method may include, for example, a magnetic resonance, magnetic induction and electromagnetic wave method, and additional circuits for wireless charging, such as a coil loop, a resonant circuit, and a rectifier may be added. The battery gauge measures, for example, a remaining quantity of the battery 296, or a voltage, a current, or a temperature during charging. The battery 296 may store or generate electricity and supply power to the electronic device 201 by using the stored or generated electricity. The battery 296 may include a rechargeable battery or a solar battery.

The indicator 297 displays particular statuses of the electronic device 201 or a part of the electronic device 201, such as a booting, message, or charging status. The motor 298 converts an electrical signal to a mechanical vibration. The electronic device 201 may include a processing unit, such as a GPU for supporting a mobile TV. The processing unit for supporting the mobile TV may process, for example, media data according to a standard of digital multimedia broadcasting (DMB), digital video broadcasting (DVB), or media flow. Each of the components of the electronic device according to embodiments of the present disclosure may be implemented by one or more components and the name of the corresponding component may vary depending on a type of the electronic device. The electronic device according to embodiments of the present disclosure may include at least one of the above described components, a few of the components may be omitted, or additional components may be further included. Some of the components of the electronic device according to embodiments of the present disclosure may be combined to form a single entity, and thus may equivalently execute functions of the corresponding components before being combined.

Figure 3:
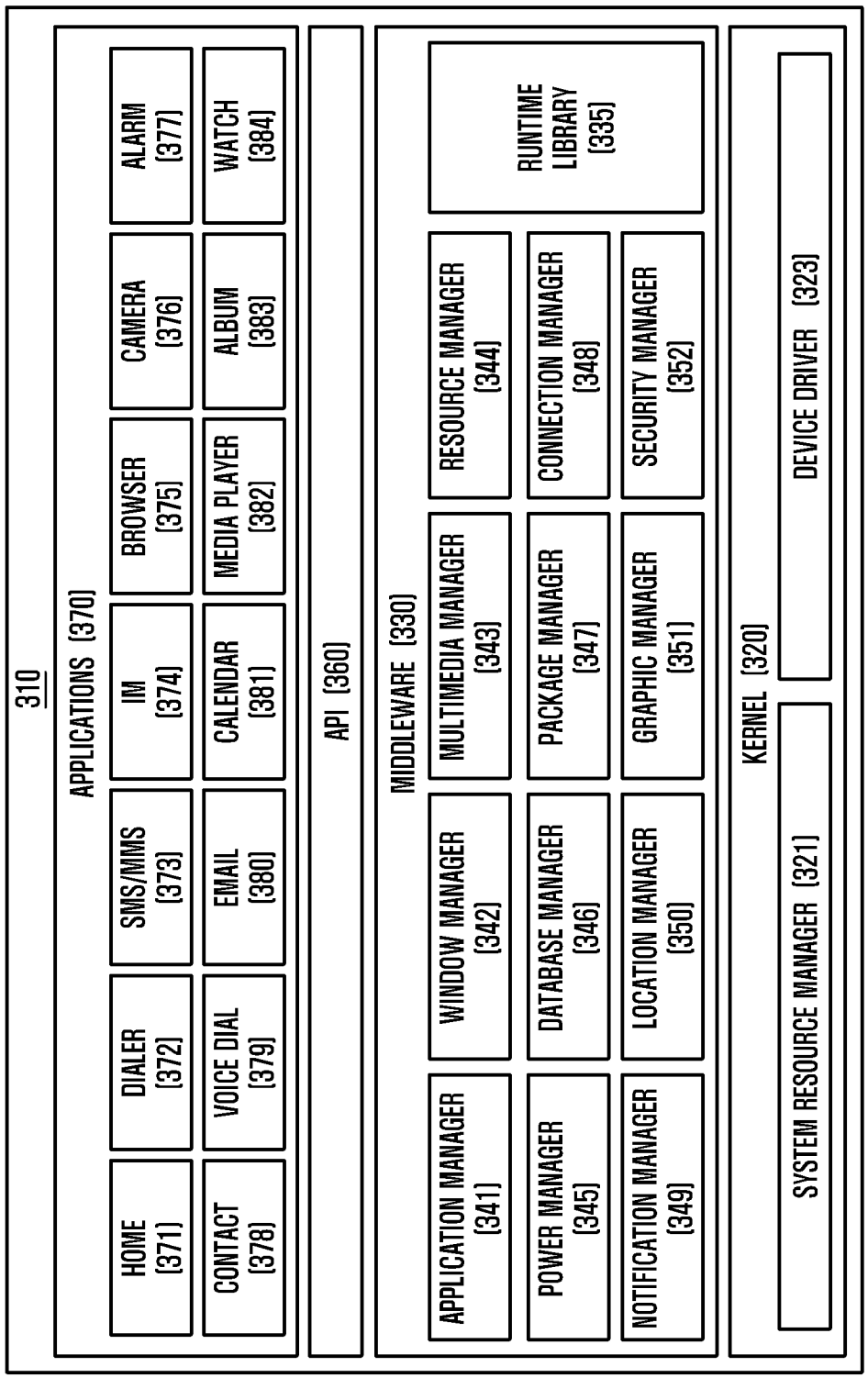
FIG. 3 is a block diagram of a program module according to various embodiments of the disclosure.

FIG. 3 is a block diagram illustrating a programming module according to embodiments of the present disclosure.

Referring to FIG. 3, a programming module 310 may be stored in the electronic apparatus 100, e.g. the memory 130, as illustrated in FIG. 1. At least a part of the programming module 310 may be configured by software, firmware, hardware, and/or combinations of two or more thereof. The programming module 310 may include an OS that is implemented in hardware 200 to control resources related to an electronic device 100, and/or various applications driven on the OS. For example, the OS may be Android™, iOS™, Windows™, Symbian™, Tizen™, or Bala™. Referring to FIG. 3, the programming module 310 may include a kernel 320 (e.g., kernel 141), middleware 330 (e.g., middleware 143), an API 360 (e.g., API 145), and the applications 370 (e.g., applications 147). At least part of the program module 310 may be preloaded on the electronic device or downloaded from an external device (e.g., external device 102, 104, server 106).

The kernel 320 may include a system resource manager 321 and/or a device driver 323. The system resource manager 321 may include, for example, a process manager, a memory manager, and a file system manager. The system resource manager 321 may control, allocate, and/or collect system resources. The device driver 323 may include, for example, a display driver, a camera driver, a BT driver, a shared memory driver, a USB driver, a keypad driver, a Wi-Fi driver, and an audio driver and an inter-process communication (IPC) driver. The middleware 330 may include a plurality of modules implemented in advance for providing functions commonly used by the applications 370. The middleware 330 may provide the functions through the API 360 such that the applications 370 may efficiently use restricted system resources within the electronic apparatus. For example, as shown in FIG. 3, the middleware 330 may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include a library module that a compiler uses in order to add a new function through a programming language while one of the applications 370 is being executed. According to an embodiment, the runtime library 335 may perform an input/output, memory management, and/or a function for an arithmetic function. The application manager 341 may manage a life cycle of at least one of the applications 370. The window manager 342 may manage graphical user interface (GUI) resources used by a screen. The multimedia manager 343 may detect formats used for reproduction of various media files, and may perform encoding and/or decoding of a media file by using a codec suitable for the corresponding format. The resource manager 344 may manage resources such as a source code, a memory, and a storage space of at least one of the applications 370. The power manager 345 may manage a battery and/or power, while operating together with a basic input/output system (BIOS), and may provide power information used for operation. The database manager 346 may manage generation, search, and/or change of a database to be used by at least one of the applications 370. The package manager 347 may manage installation and/or an update of an application distributed in a form of a package file.

For example, the connectivity manager 348 may manage wireless connectivity such as Wi-Fi or BT. The notification manager 349 may display and/or notify of an event, such as an arrival message, a promise, and a proximity notification, in such a manner that does not disturb a user. The location manager 350 may manage location information of an electronic apparatus. The graphic manager 351 may manage a graphic effect which will be provided to a user, and/or a user interface related to the graphic effect. The security manager 352 may provide all security functions used for system security and/or user authentication. According to an embodiment, when an electronic apparatus 100 has a telephone call function, the middleware 330 may further include a telephony manager for managing a voice and/or video communication function of the electronic apparatus. The middleware 330 may generate and use a new middleware module through various functional combinations of the aforementioned internal element modules. The middleware 330 may provide modules specialized according to types of OSs in order to provide differentiated functions. The middleware 330 may dynamically remove some of the existing elements and/or add new elements, and may exclude some of the elements described in the embodiments of the present disclosure, further include other elements, and/or substitute the elements with elements having a different name and performing a similar function. The API 360 is a set of API programming functions, and may be provided with a different configuration according to the OS. For example, in Android or iOS, one API set may be provided for each of platforms, and in Tizen, two or more API sets may be provided.

The applications 370 may include applications for performing various functions, e.g., home 371, diary 372, SMS/multimedia messaging service (MMS) 373, instant message (IM) 374, browser 375, camera 376, alarm 377, contact 378, voice dial 379, email 380, calendar 381, media player 382, album 383, clock 384, health care, such as an application for measuring amount of exercise or blood sugar level, and environment information, such as, an application for providing atmospheric pressure, humidity, or temperature. According to an embodiment, the applications 370 are capable of including an application for supporting information exchange between an electronic device and an external device. The information exchange application is capable of including a notification relay application for relaying specific information to external devices or a device management application for managing external devices. For example, the notification relay application is capable of including a function for relaying notification information, created in other applications of the electronic device, such as an SMS/MMS application, email application, health care application, or environment information application to external devices. In addition, the notification relay application is capable of receiving notification information from external devices to provide the received information to the user. The device management application is capable of managing at least one function of an external device communicating with the electronic device. Examples of the function are turning-on/off the external device or part of the external device, controlling the brightness (or resolution) of the display, applications running on the external device, and services provided by the external device such as a call or messaging service. According to an embodiment, the applications 370 may include a health care application of a mobile medical device, and specified attributes of an external device. The applications 370 are capable of including applications received from an external device, and a preloaded application or third party applications that can be downloaded from a server. It should be understood that the components of the program module 310 may be called different names according to types of operating systems. According to embodiments, at least part of the program module 310 can be implemented with software, firmware, hardware, or any combination of two or more of them. At least part of the program module 310 can be implemented by a processor. At least part of the programming module 310 may include modules, programs, routines, sets of instructions or processes, etc., in order to perform one or more functions.

The term "module" used in the present disclosure may refer to, for example, a unit including at least one combination of hardware, software, and firmware. The "module" may be interchangeably used with a term, such as unit, logic, logical block, component, and/or circuit. The "module" may be a minimum unit of an integrally configured article and/or a part thereof, may be a minimum unit performing at least one function and/or a part thereof, and may be mechanically and/or electronically implemented. For example, the "module" according to the present disclosure may include at least one of an application-specific IC (ASIC) chip, a field-programmable gate arrays (FPGA), and a programmable-logic device for performing operations which have been known and/or are to be developed.

According to embodiments, at least part of the devices or the method according to the present disclosure may be implemented by a command stored in a computer-readable storage medium in a programming module form. When the instructions are executed by at least one processor, the at least one processor may perform functions corresponding to the instructions. The computer-readable storage medium may be, for example, the memory 130. At least a part of the programming module may be implemented by the processor 120. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a compact disc ROM (CD-ROM) and a DVD, magneto-optical media such as a floptical disk, and hardware devices specially configured to store and perform a program instruction, such as a ROM, a RAM, or a flash memory. In addition, the program instructions may include high class language codes, which may be executed in a computer by using an interpreter, as well as machine codes made by a compiler. The aforementioned hardware device may be configured to operate as one or more software modules in order to perform the operation of the present disclosure, and vice versa.

The module or programming module of the present disclosure may include at least one of the aforementioned components with omission of some components or addition of other components. The operations of the modules, programming modules, or other components may be executed in series, in parallel, recursively, or heuristically. Some operations may be executed in a different order, omitted, or extended with other operations.

Figure 4:
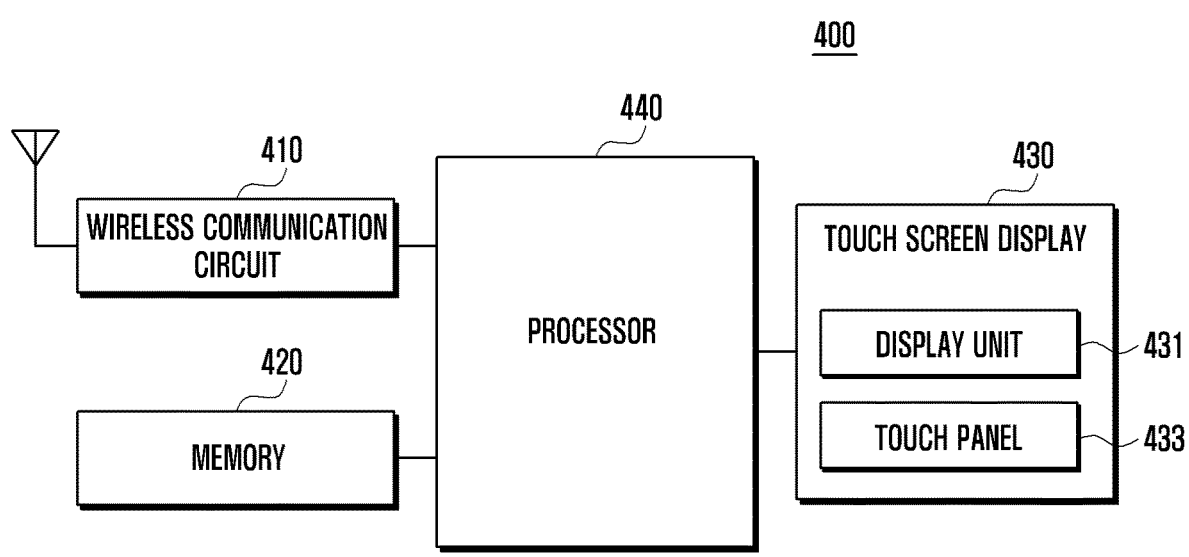
FIG. 4 is a block diagram of an electronic device according to various embodiments of the disclosure.

FIG. 4 is a block diagram of an electronic device according to various embodiments of the disclosure;

Referring to FIG. 4, an electronic device 400 (for example, the electronic device 101 of FIG. 1) may include a wireless communication circuit 410, a memory 420, a touch screen display 430, and a processor 440.

According to various embodiments of the disclosure, the wireless communication circuit 410 (for example, the communication interface 170 of FIG. 1 or the communication module 220 of FIG. 2) may establish communication between the electronic device 400 and an external electronic device (for example, the electronic device 102, the electronic device 104, or the server 106 of FIG. 1).

According to various embodiments of the disclosure, the memory 420 (for example, the memory 130 of FIG. 1 or the memory 230 of FIG. 2) may store a user interface associated with a call application program and a payment application program.

According to various embodiments of the disclosure, the touch screen display 430 may be configured as an integrated form including a display unit 431 (for example, the display 160 of FIG. 1 or the display 260 of FIG. 2) and a touch panel 433 (for example, the input device 250 of FIG. 2).

According to various embodiments of the disclosure, the touch screen display 430 may display a user interface according to execution of a call application under control of the processor 440. The touch screen display 430 may display data associated with a phone number of a service provider input through the user interface of the call application under control of the processor 440. The touch screen display 430 may display a button associated with a payment application under control of the processor 440. The touch screen display 430 may display at least one object for selecting a product ordering method under control of the processor 440. The touch screen display 430 may display a user interface according to execution of the payment application in response to an input for selecting the button under control of the processor 440. The touch screen display 430 may display a payment result in response to a payment function performed through the user interface of the payment application under control of the processor 440.

According to various embodiments of the disclosure, the processor 440 (for example, the processor 210 of FIG. 2) may control overall operation of the electronic device 400 and a signal flow between elements of the electronic device 400, perform data processing, and control power supply to the elements by a battery.

According to various embodiments of the disclosure, the processor 440 may detect an input of a phone number of a service provider through the call application user interface displayed by execution of the call application. When a request for a call connection to the phone number is detected, the processor 440 may receive data related to at least one of the phone number of user identification information of the electronic device 400 from an external electronic device (for example, a service server).

According to various embodiments of the disclosure, the data is an item which can be currently used for a specific time period and may include, for example, information on a product which the service provider (for example, home shopping) sells while the phone number is input.

According to various embodiments of the disclosure, the processor 440 may display data received on the call application user interface and a button associated with the payment application through which the data is paid for. According to various embodiments of the disclosure, the button associated with the payment application may be a button for performing a payment function of the data through a payment service, for example, a payment application (for example, a Samsung Pay application).

According to various embodiments of the disclosure, the processor 440 may make the call connection to the service provider corresponding to the phone number input through the call application user application via the wireless communication circuit 410. The processor 440 may perform an operation for ordering the product in response to the call connection. If the order is completed, the processor 440 may receive payment information required for paying for the ordered product from a payment server. The payment information of the product may include at least one of user identification information (for example, a business name and a business number), an ordered product name, information on the number of products, and paid amounts.

According to various embodiments of the disclosure, upon receiving payment information required for payment for the product to be ordered and detecting an input for selecting the button associated with the payment application, the processor 440 may perform payment on the basis of the payment information.

According to various embodiments of the disclosure, upon detecting an input of the phone number of the service provider through the call application user interface, the processor 440 may display the phone number, data associated with the user identification information of the electronic device 400, the button associated with the payment application, and at least one object for selecting a product ordering method on the call application user interface. For example, at least one object may include a first object for ordering a product through a call connection (for example, through a representative or an ARS) and a second object for ordering a product through a separate user interface.

According to various embodiments of the disclosure, upon detecting selection of the first object for ordering the product through the call connection, the processor 440 may perform an operation for ordering the product through the phone call to the phone number of the service provider.

According to various embodiments of the disclosure, upon detecting selection of the second object for ordering the product through the separate user interface, the processor 440 may display a product ordering screen. If the product order is completed through the product ordering screen, the processor 440 may perform payment on the basis of the payment information required for payment for the ordered product.

Figure 5:
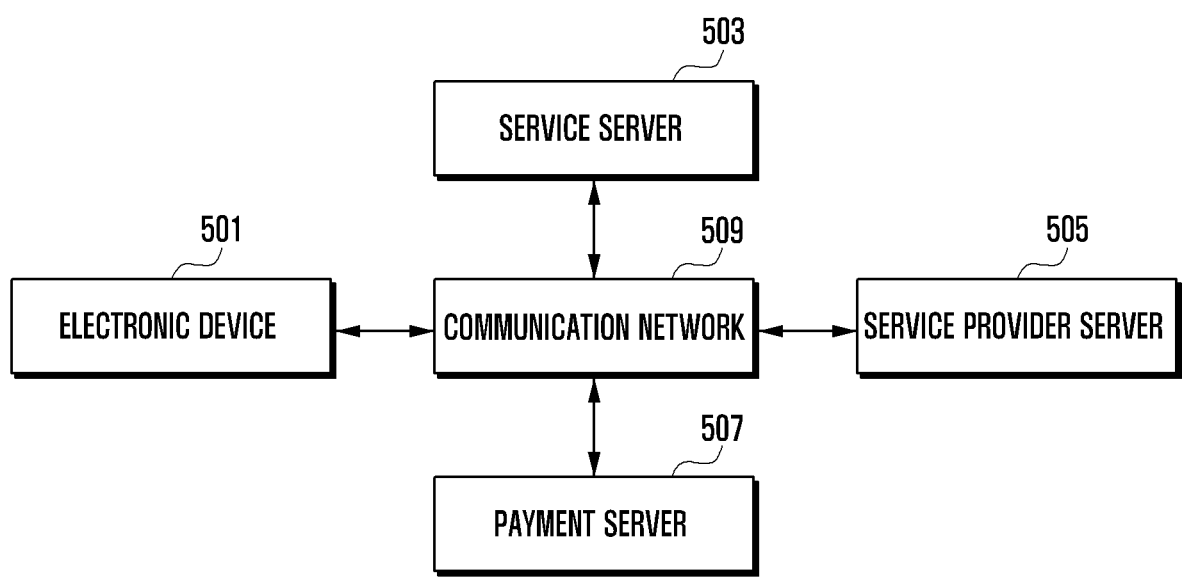
FIG. 5 is a block diagram illustrating a system for performing a product payment function according to various embodiments of the disclosure.

FIG. 5 is a block diagram illustrating a system for performing a product payment function according to various embodiments of the disclosure.

Referring to FIG. 5, according to various embodiments of the disclosure, the system for performing the payment function may include at least one of an electronic device 501 (for example, the electronic device 400 of FIG. 4), a service server 503, a service provider server 505, and a payment server 507. The elements included in the system may be connected through a communication network 509 (for example, the network 162 of FIG. 1).

According to various embodiments of the disclosure, if a user of the electronic device 501 desires to perform the payment function in order to purchase a product sold by the service provider or pay charges through the electronic device 501, the user may perform payment using the payment service (for example, Samsung Pay) to which the electronic device 501 has subscribed.

According to various embodiments of the disclosure, the service server 503 may store user identification information of users subscribing to the payment service (for example, account information or a phone number preset for each user in order to identify each user) and payment means information (for example, account and credit card) of each user in a database.

According to various embodiments of the disclosure, if information on a product is registered by a service provider (for example, a service provider selling the product (for example, home shopping service provider and shopping mall service provider) or a utility bill issuing institution), the service server 503 may store service provider identification information (for example, phone number) of the service provider and information on the product in a database. The information on the product may include at least one of a product name, a product identification number, product image information, product price, discount information, coupon information, information on the time at which the product is sold, and page information. The service server 503 may store information on whether the payment service is supported.

According to various embodiments of the disclosure, upon receiving the service provider identification information from the electronic device 501, the service server 503 may search for product information associated with the service provider identification information and transmit the found product information to the electronic device 501.

According to various embodiments of the disclosure, if the information on the product is registered by the service provider, the service server 503 may store the information on the product and user identification information (for example, phone number) of the electronic device 501 in a database. The information on the product stored along with the user identification information of the electronic device 501 may include utility fee information.

According to various embodiments of the disclosure, upon receiving the service provider information and the user identification information of the electronic device 501 from the electronic device 501, the service server 503 may search for product information associated with the user identification information and the user identification information of the electronic device 501 and transmit the found information to the electronic device 501.

According to various embodiments of the disclosure, the service server 503 may generate a transaction number. For example, the service server 503 may generate the transaction number on the basis of at least one piece of the service provider identification information, the user identification information, and the product information received from the electronic device 501. The user of the electronic device 501 may perform the product order on the basis of the generated transaction number.

According to various embodiments of the disclosure, the service provider server 505 may register products to be sold in the service server 503. For example, the service provider server 505 may map user identification information and a product to be sold according to time and register the mapped information in the service server 503. Further, the service provider server 505 may map information on a product (for example, utility fees) to be paid for and user identification information and register the mapped information in the service server 503.

According to various embodiments of the disclosure, the service provider server 505 may receive user identification information of the electronic device 501 and perform payment through the service server 503. For example, upon receiving a request for ordering a product for sale, the service provider server 505 may map order information including at least one of a product name ordered by the user of the electronic device 501, information on the number of products, and product price to the transaction number and make a request for payment to the payment server 507. According to various embodiments of the disclosure, if there is coupon information or discount information for the product, the product price may be price reflecting the coupon and discount.

According to various embodiments of the disclosure, the payment server 507 may perform processing related to the payment. For example, the payment server 507 may include or may be connected to various services for performing processing related to the payment, such as a mobile carrier server, a card company server, and a financial institution server to perform payment processing according to a payment type.

According to various embodiments of the disclosure, the payment server 507 may generate authentication information in response to a request signal for payment for the product received from the service provider server 505. The payment server 507 may transmit the generated authentication information to the electronic device 501 and make a request for authentication. Upon receiving the authentication result from the electronic device 501, the payment server 507 may perform approval of the payment on the basis of the authentication result. The payment server 507 may transmit the payment approval result to the electronic device 501, the service server 503, and the service provider server 505.

According to various embodiments of the disclosure, the payment server 507 may transmit/receive and process information related to the payment. The payment server 507 may manage a payment service user account (for example, Samsung account) or payment means (for example, account and credit card) linked to the payment service user account.

According to various embodiments of the disclosure, the payment server 507 may provide an interface for processing information related to the payment.

Figure 6:
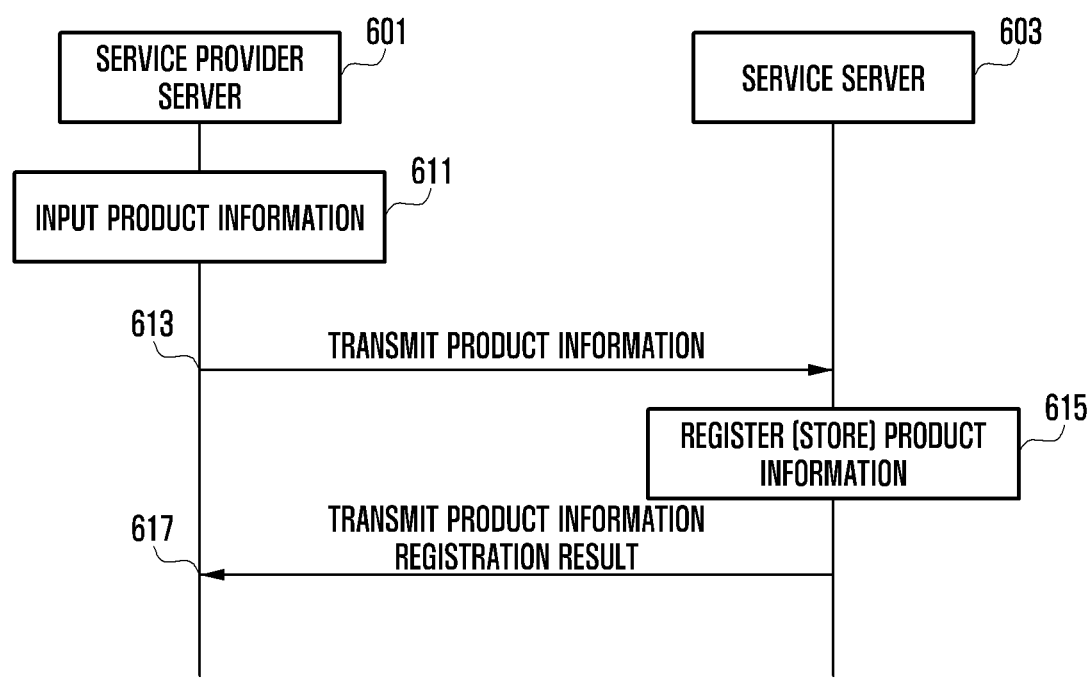
FIG. 6 illustrates signal flow between servers in a method of registering product information according to various embodiments of the disclosure.

FIG. 6 illustrates a signal flow between servers in a method of registering product information according to various embodiments of the disclosure.

Referring to FIG. 6, a service provider server 601 (for example, the service provider server 505 of FIG. 5) may input information on a product in step 611.

According to various embodiments of the disclosure, the service provider server 601 may display a user interface for inputting the information on the product. For example, the user interface for inputting the information on the product may include a service admin screen and a screen according to execution of an API. The service provider server 601 may input the information on the product through the user interface. The information on the product may include at least one piece of user identification information of the electronic device, service provider identification information, a product name, a product identification number, product image information, product price, discount information, coupon information, information on the time at which the product is sold, and page information.

According to various embodiments of the disclosure, the service provider server 601 may transfer the input information on the product to the service server 603 (for example, the service server 503 of FIG. 5) in step 613.

According to various embodiments of the disclosure, the service server 603 may register (store) the information on the product received from the service provider server 601 in step 615. For example, the service server 603 may store user identification information, for example, a phone number and the information on the product in a database. Alternatively, the service server 603 may store the user identification information of the electronic device (for example, a phone number or a user account) and the information on the product in a database.

According to various embodiments of the disclosure, the service server 603 may transfer the registration result of the information on the product to the service provider server 601 in step 617.

Figure 7A:
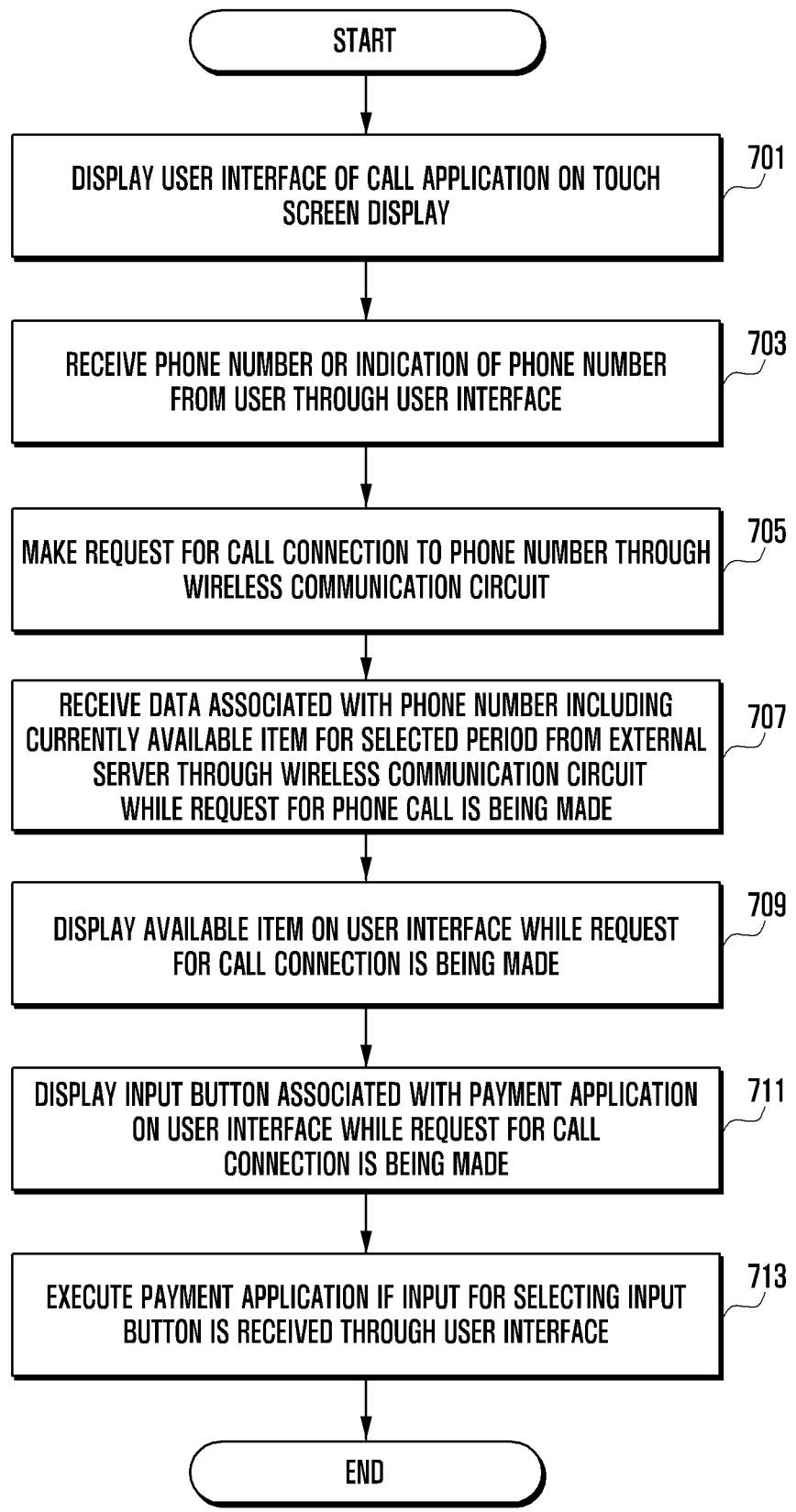
FIG. 7A is a flowchart illustrating a method by which the electronic device performs a product payment function according to various embodiments of the disclosure.

FIG. 7A is a flowchart illustrating a method by which the electronic device performs a product payment function according to various embodiments of the disclosure.

Referring to FIG. 7A, an electronic device (for example, the electronic device 400 of FIG. 4) may display a user interface of a call application on a touch screen display (for example, the touch screen display 430 of FIG. 4) in operation 701.

According to various embodiments of the disclosure, the electronic device may receive a phone number or an indication of the phone number from the user through the user interface in operation 703. For example, the electronic device may detect an input of a phone number of a service provider (for example, home shopping) for which the product is ordered or an institution issuing utility bills.

According to various embodiments of the disclosure, the electronic device may make a request for a call connection to the phone number through a wireless communication circuit (for example, the wireless communication circuit 410 of FIG. 4) in operation 705.

According to various embodiments of the disclosure, the electronic device may receive data related to the phone number, including items, which can be currently used, for a selected period from an external server (for example, the service server 603 of FIG. 6) while the request for the call connection is being made in operation 707. For example, the items may include information on a product which is being sold by a service provider, for example, home shopping at the time at which the phone number is input. As described above, according to various embodiments of the disclosure, the information on the product may include at least one piece of service provider identification information (for example, a phone number), a product name, a product identification number, product image information, product price, discount information, coupon information, and information on the time at which the product is sold.

According to various embodiments of the disclosure, the electronic device may display items which can be used by the user interface while the request for the call connection is being made in operation 709.

According to various embodiments of the disclosure, the electronic device may display an input button associated with the payment application on the user interface while the request for the call connection is being made in operation 711.

According to various embodiments of the disclosure, if a payment function of the item (for example, a product) can be performed using a payment service, for example, a payment application (for example, a Samsung Pay application), the electronic device may display a button associated with the payment application. For example, the electronic device may receive information on whether the service provider supports the payment service from an external server (for example, the service server 603 of FIG. 6). The electronic device may display the button associated with the payment application on the basis of the information on whether the payment service is supported, received from the external server.

According to various embodiments of the disclosure, upon receiving an input for selecting an input button through the user interface, the electronic device may execute the payment application in operation 713.

According to various embodiments of the disclosure, if a payment means (for example, a credit card) is determined through execution of the payment application, the electronic device may acquire user authentication in order to perform the payment function for the product through the determined payment means. The electronic device may complete approval of payment using the payment service via the authentication procedure based on the acquired user authentication. For example, the user authentication may include an authentication code generated using a particular time (for example, payment time or preset time) and biometric recognition (for example, fingerprint scan through a fingerprint sensor or iris recognition).

Figure 7B:
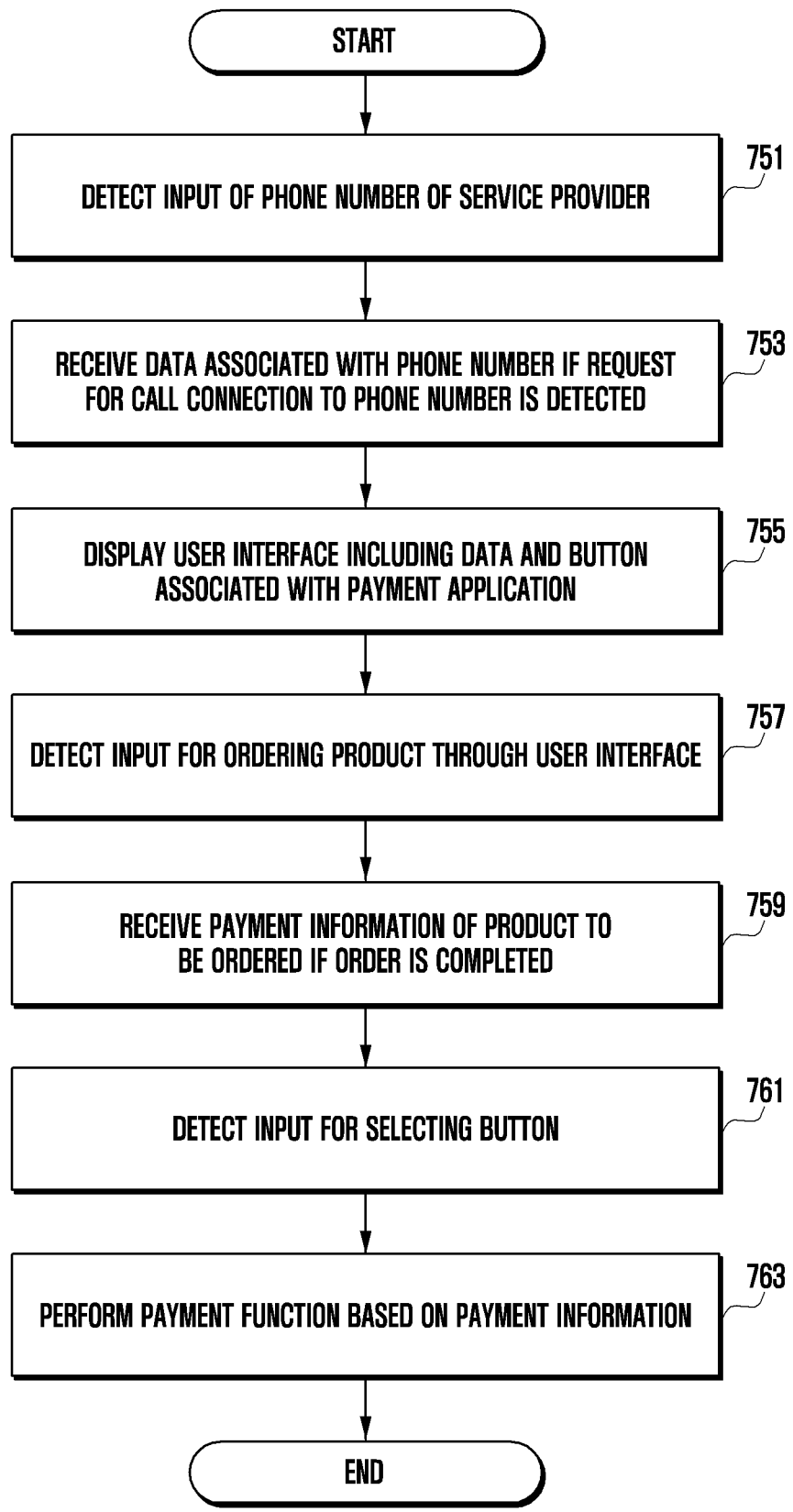
FIG. 7B is a flowchart illustrating a method by which the electronic device performs a product payment function according to various embodiments of the disclosure.

FIG. 7B is a flowchart illustrating a method by which the electronic device performs a product payment function according to various embodiments of the disclosure.

According to various embodiments of the disclosure, FIG. 7B illustrates in more detail, the method of performing the product payment function of FIG. 7A described above.

Referring to FIG. 7B, the electronic device (for example, the electronic device 400 of FIG. 4) may detect an input of the phone number of the service provider in operation 751. According to various embodiments of the disclosure, the service provider may include a service provider (for example, home shopping) for which a product can be ordered and an institution issuing utility bills through the phone number.

According to various embodiments of the disclosure, the electronic device may detect the input of the phone number of the service provider in the call application user interface displayed by execution of the call application.

Upon receiving a request for a call connection to the phone number, the electronic device may receive data related to the phone number in operation 753.

According to various embodiments of the disclosure, the electronic device may transmit the phone number input through the call application user interface to an external electronic device (for example, an external server (for example, the service server 603 of FIG. 6)).

The external electronic device may search for data related to the phone number received from the electronic device. If there is data related to the phone number on the basis of the search result, the external electronic device may transmit the data to the electronic device.

According to various embodiments of the disclosure, the data may include, for example, information on a product sold by the service provider, for example, home shopping at the time at which the phone number is input.

According to various embodiments of the disclosure, the electronic device may transmit the phone number input through the call application user interface and identification information (for example, a phone number) of the electronic device to the external electronic device (for example, the service server 603 of FIG. 6).

The external electronic device may search for data related to the phone number received from the electronic device and the identification information of the electronic device. If there is data related to the received phone number and the identification information of the electronic device, the external electronic device may transmit the data to the electronic device.

The electronic device may display a user interface including the received data and a button associated with the payment application for paying for the data in operation 755 while the request for the call connection to the phone number is detected.

According to various embodiments of the disclosure, if a function of paying for the data (for example, a product) can be performed using the payment service, for example, the payment application (for example, a Samsung pay application), the electronic device may display the button associated with the payment application.

According to various embodiments of the disclosure, the button associated with the payment application may be a payment button for performing the payment function through execution of the payment application.

According to various embodiments of the disclosure, the button may be displayed just for awareness of the user so that the user can recognize that the product payment function can be performed through the payment service to which the electronic device has subscribed, and may be in an inactive state in operation 755. In other words, if the product payment function can be performed using the payments service, the electronic device may display a user interface including data, for example, product information including at least one piece of service provider information (for example, the phone number) received from the external electronic device (for example, the service server 603 of FIG. 6), a product bane associated with the time at which the service provider identification information is input through the call application user interface, a product identification number, product image information, product price, discount information, and coupon information and the button associated with the payment application.

According to various embodiments of the disclosure, although it has been described that, upon receiving a request for the call connection to the phone number of the service provider input through the call application user interface, the electronic device displays data related to the phone number and the button associated with the payment application on the call application user interface, the disclosure is not limited thereto.

For example, according to various embodiments of the disclosure, the electronic device may receive data related to the phone number of the service provider from the external electronic device (for example, the external server (for example, the service server 603 of FIG. 6)) only through the input of the phone number of the service provider without any request for the call connection to the phone number, and may perform operation 757 described below after displaying the data related to the phone number and the button associated with the payment application on the call application user interface.

The electronic device may detect an input for ordering the product in operation 757.

According to various embodiments of the disclosure, the electronic device may make a call connection to the service provider corresponding to the phone number input through the call application user interface via a wireless communication circuit (for example, the wireless communication circuit 410 of FIG. 4). The electronic device may perform an operation for ordering the product in response to the call connection. For example, the user of the electronic device may order the product through the connection to a representative or using a keypad after ARS connection. The user may order the product by inputting information on the number of products to be purchased and destination information through the call connection.

If the order is completed, the electronic device may receive payment information required for payment for the ordered product in operation 759.

According to various embodiments of the disclosure, if the product order through the call connection is completed, the electronic device may receive payment information required for payment for the ordered product from the external electronic device (for example, the external server (for example, the payment server 507 of FIG. 5).

According to various embodiments of the disclosure, the payment information required for payment for the product may include at least one of service provider identification information (for example, a business name and a business number), an ordered product name, information on the number of products, and paid amounts.

Upon receiving the payment information required for payment for the product to be ordered, the electronic device may detect an input for selecting the button associated with the payment application in operation 761.

According to various embodiments of the disclosure, the button may be a button switched to an active state in operation 761. For example, upon receiving the payment information required for payment for the product to be ordered, the electronic device may switch the button to the active state in which the button can be selected to perform the payment function using the payment service and display the switched button.

Upon detecting an input for selecting the button associated with the payment application, the electronic device may perform the payment function on the basis of the received payment information in operation 763.

According to various embodiments of the disclosure, upon detecting the input for payment for the ordered product, for example, the input for selecting the button switched to the active state, the electronic device may execute the payment service, for example, the payment application. The electronic device may perform the payment function on the product using a payment means (for example, a credit card) in response to execution of the payment application. For example, the electronic device may acquire user authentication (for example, authentication code or biometric recognition) to perform the payment function, and may complete approval of the payment using the payment service via an authentication procedure based on the acquired user authentication.

This will be described in detail with reference to FIGS. 8 to 13B.

As described above, according to various embodiments of the disclosure, it has been described that the product order and payment are performed through the call connection, but the disclosure is not limited thereto.

According to various embodiments of the disclosure, upon detecting the input of the phone number of the service provider through the call application user interface displayed by execution of the call application, the electronic device may transmit at least one of the phone number of the service provider and identification information of the electronic device to the external electronic device (for example, the service server 603 of FIG. 6). The electronic device may receive data related to at least one of the phone number of the service provider and the identification information of the electronic device from the external electronic device. The electronic device may display the received data and a button associated with the payment application for paying for the data on the call application user interface.

According to various embodiments of the disclosure, the user interface may further display at least one object for selecting a product ordering method. For example, at least one object may include a first object for ordering a product through a phone call (for example, through a representative or an ARS) and a second object for ordering a product through a separate user interface.

According to various embodiments of the disclosure, upon detecting selection of the first object for ordering the product through a call connection, the electronic device may perform an operation for ordering the product through the call connection to the input phone number of the service provider. For example, this may be the same as the operation of FIG. 7A.

According to various embodiments of the disclosure, upon detecting selection of the second object for ordering the product through a separate user interface, the electronic device may display a product ordering screen. The product ordering screen may include at least one of a product name, a product identification number, product image information, product price, discount information, coupon information, information on the number of products, and destination information. The user of the electronic device may order the product by inputting information on the number of products to be purchased and destination information into the product ordering screen.

According to various embodiments of the disclosure, if the product order is completed, the electronic device may receive payment information required for payment for the ordered product. Upon detecting an input for selecting the button switched to the active state, the electronic device may perform the payment function by executing the payment application.

This will be described in detail with reference to FIGS. 14A and 14B.

Figure 8:
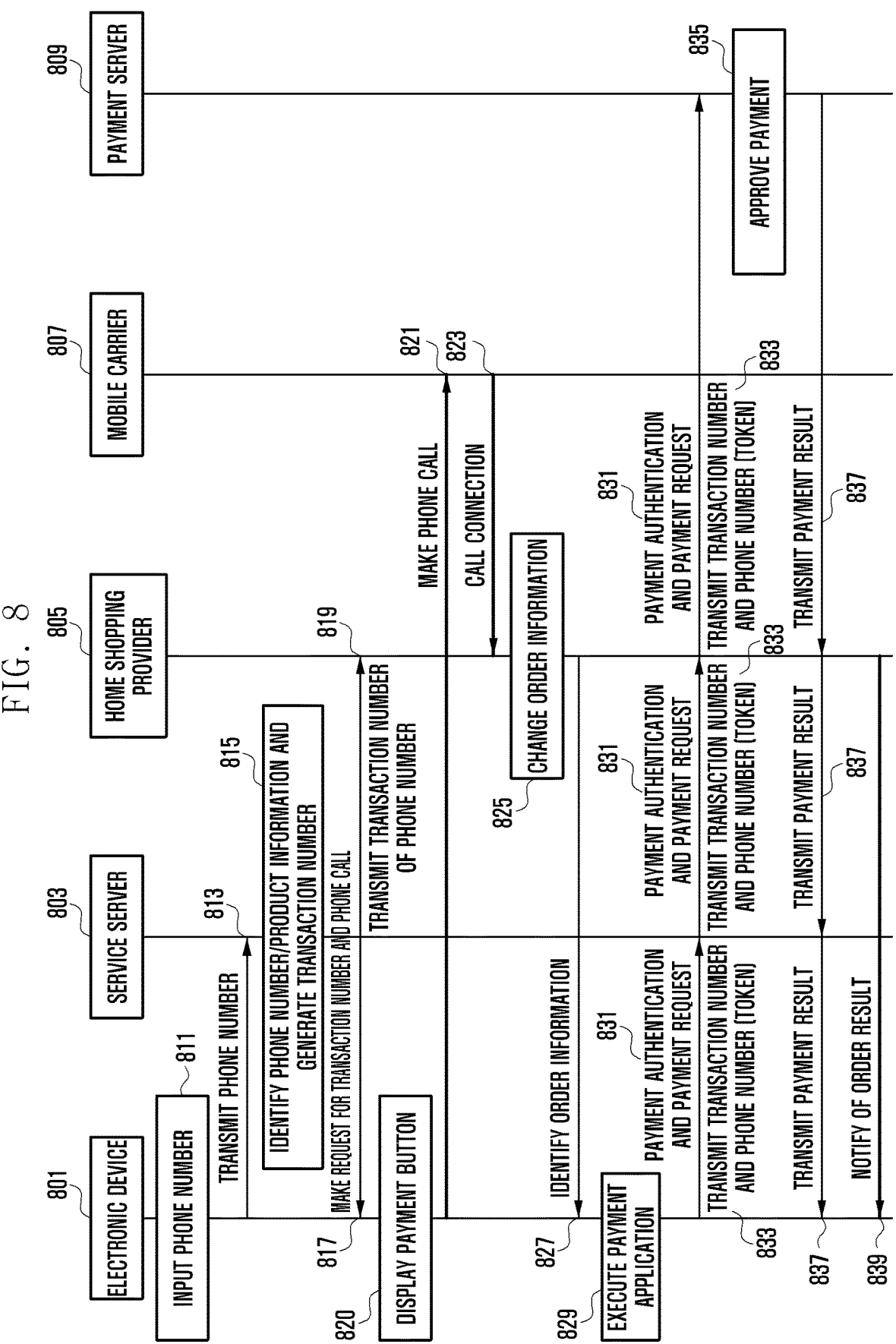
FIG. 8 illustrates a signal flow between an electronic device and a server in a method of performing a product payment function according to various embodiments of the disclosure.

FIG. 8 illustrates a signal flow between an electronic device and a server in a method of performing a product payment function according to various embodiments of the disclosure.

Hereinafter, according to various embodiments of the disclosure, it is assumed that a service provider is a home shopping service provider.

Referring to FIG. 8, according to various embodiments of the disclosure, a payment system may include an electronic device 801 (for example, the electronic device 501 of FIG. 5), a service server 803 (for example, the service server 503 of FIG. 5), a home shopping provider 805 (for example, the service provider server 505 of FIG. 5), a mobile carrier 807 (for example, the communication network 509 of FIG. 5), and a payment server 809 (for example, the payment server 507 of FIG. 5).

According to various embodiments of the disclosure, the electronic device 801 may detect an input of a phone number (for example, a phone number of the home shopping provider 805) of the service provider in a call application user interface in step 811. If the phone number is input, the electronic device 801 may transfer the phone number to the service server 803 in step 813. The service server 803 may be a server that stores the phone number of the service provider, product information associated with the phone number, identification information of the electronic device, product information associated with the identification information of the electronic device, and information on whether a payment service (for example, Samsung Pay) is supported.

According to various embodiments of the disclosure, the service server 803 may identify product information associated with the phone number received from the electronic device 801 and generate a transaction number in step 815. For example, the service server 803 may generate the transaction number (for example, 01012345678-20161201-1800) on the basis of at least one piece of the service provider identification information, the user identification information, and the product information received from the electronic device 801.

According to various embodiments of the disclosure, the service server 803 may further transfer information on whether the payment service is supported to the electronic device 801.

According to various embodiments of the disclosure, the service server 803 may transfer the generated transaction number to the electronic device 801 and make a request for a call connection to the phone number in step 817. The service server 803 may transfer the generated transaction number and the phone number of the home shopping provider 805 in step 819.

According to various embodiments of the disclosure, the transaction number may be a number corresponding to a combination of at least one of the service provider identification information, the user identification information, and the product information received from the electronic device 801.

According to various embodiments of the disclosure, the electronic device 801 may display the button associated with the payment application on the call application user interface in step 820. For example, the electronic device 801 may receive information on whether the payment service is supported, received from the service server 803. This may mean that a product payment function can be performed using the payment service, for example, the payment application (for example, a Samsung Pay application). The electronic device 801 may display the button associated with the payment application on the basis of the information on whether the payment service received from the service server 803 is supported.

According to various embodiments of the disclosure, the electronic device 801 may further receive product information associated with the phone number from the service server 803 and display the button associated with the payment application and the received product information on the call application user interface.

According to various embodiments of the disclosure, the electronic device 801 may make a request for the call connection to the phone number to the mobile carrier 807 in response to the request for the call connection received from the service server 803 in step 821.

The mobile carrier 807 may control the call connection between the electronic device 801 and the home shopping provider 805 corresponding to the phone number in step 823.

According to various embodiments of the disclosure, upon detecting a request for changing the order information, the home shopping provider 805 may change the order information in step 825 and may transfer a signal for making a request for identifying the order information to the electronic device 801 in step 827. For example, upon receiving a voice signal for changing the ordered product from the electronic device 801, the home shopping provider 805 may change the order information on the basis thereof.

According to various embodiments of the disclosure, if an input for selecting the button associated with the payment application is detected after the order information is identified, the electronic device 801 may execute the payment application in step 829. The electronic device 801 may make a request for authenticating payment and payment for the ordered product to the payment server 809 through the service server 803 and the home shopping provider 805 in step 831.

According to various embodiments of the disclosure, the electronic device 801 may transfer the transaction number and the phone number to the payment server 809 through the service server 803 and the home shopping provider 805 in step 833.

According to various embodiments of the disclosure, the electronic device 801 may transfer token information to the payment server 809 through the service server 803 and the home shopping provider 805 in step 833. For example, the electronic device 801 may transmit token information stored in the memory (for example, the memory 420 of FIG. 4) of the electronic device 801 to the payment server 809 according to the payment request using the payment service. According to various embodiments of the disclosure, the token information stored in the memory may be information related to a token issued and received from the payment server 809.

According to various embodiments of the disclosure, the electronic device 801 may receive the token information from the payment server 809. For example, upon receiving a request for payment, the electronic device 801 may transmit a signal for making a request for the token to the payment server 809. The electronic device 801 may receive the token from the payment server 809 in response to the signal and store the received token. For example, the payment server 809 may store information associated with transaction or authentication, for example, information required to be secured, such as payment means information, a token, and an encryption key. The payment means information may include information on a credit card. The token is digital data replacing information on the credit card and may be received from a server of a credit card company when the credit card is stored in the electronic device 801. Alternatively, the token may be updated while being periodically received from the server of the credit card company or may be stored in the memory or the payment server 809. The payment means information and the token may be information used when the payment function is performed, and the encryption key may be used to generate encryption data for payment authentication. The payment means information and the token may be transmitted to the electronic device 801 together with the generated encryption data.

According to various embodiments of the disclosure, the payment server 809 may perform payment approval in step 835 and transfer the payment authentication result to the electronic device 801 through the home shopping provider 805 and the service server 803 in step 837.

According to various embodiments of the disclosure, upon receiving the payment approval result from the payment server 809, the home shopping provider 805 may provide the order result, for example, final payment approval of the product to the electronic device 801 in step 839.

According to various embodiments of the disclosure, information on the aforementioned operations may be transmitted and received using at least one of a combination of a circuit network and a packet network and a voice of Internet protocol (VoIP).

For example, according to various embodiments of the disclosure, information on operation 821, operation 823, operation 827, and operation 839 is voice signals and may be transmitted and received through the circuit network.

Information on operations other than operation 821, operation 823, operation 827, and operation 839 may be transmitted and received using at least one of the packet network and the VoIP.

Figure 9A:
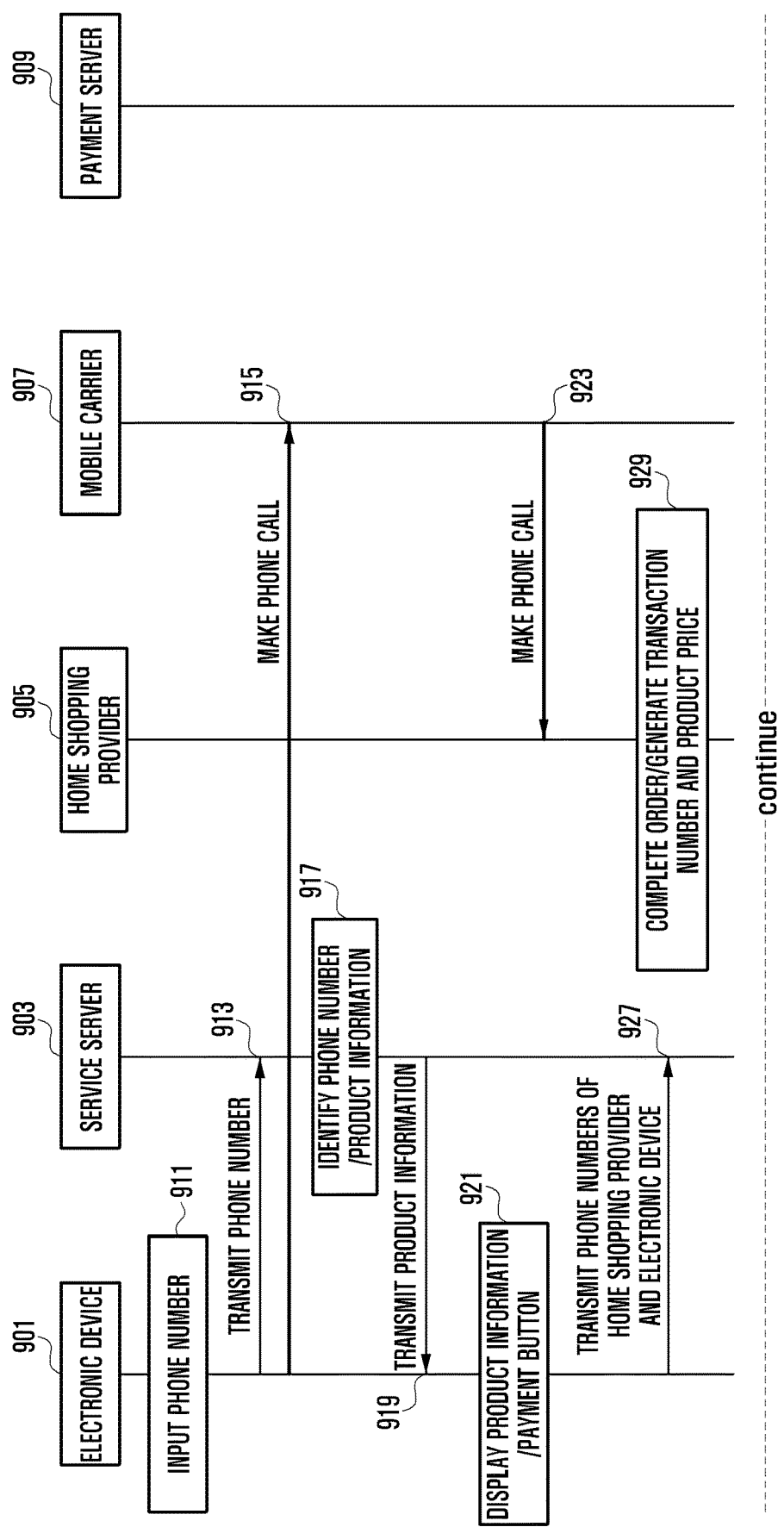
FIGS. 9A and 9B illustrate a signal flow between an electronic device and a server in a method of performing a product payment function according to various embodiments of the disclosure.
Figure 9B:
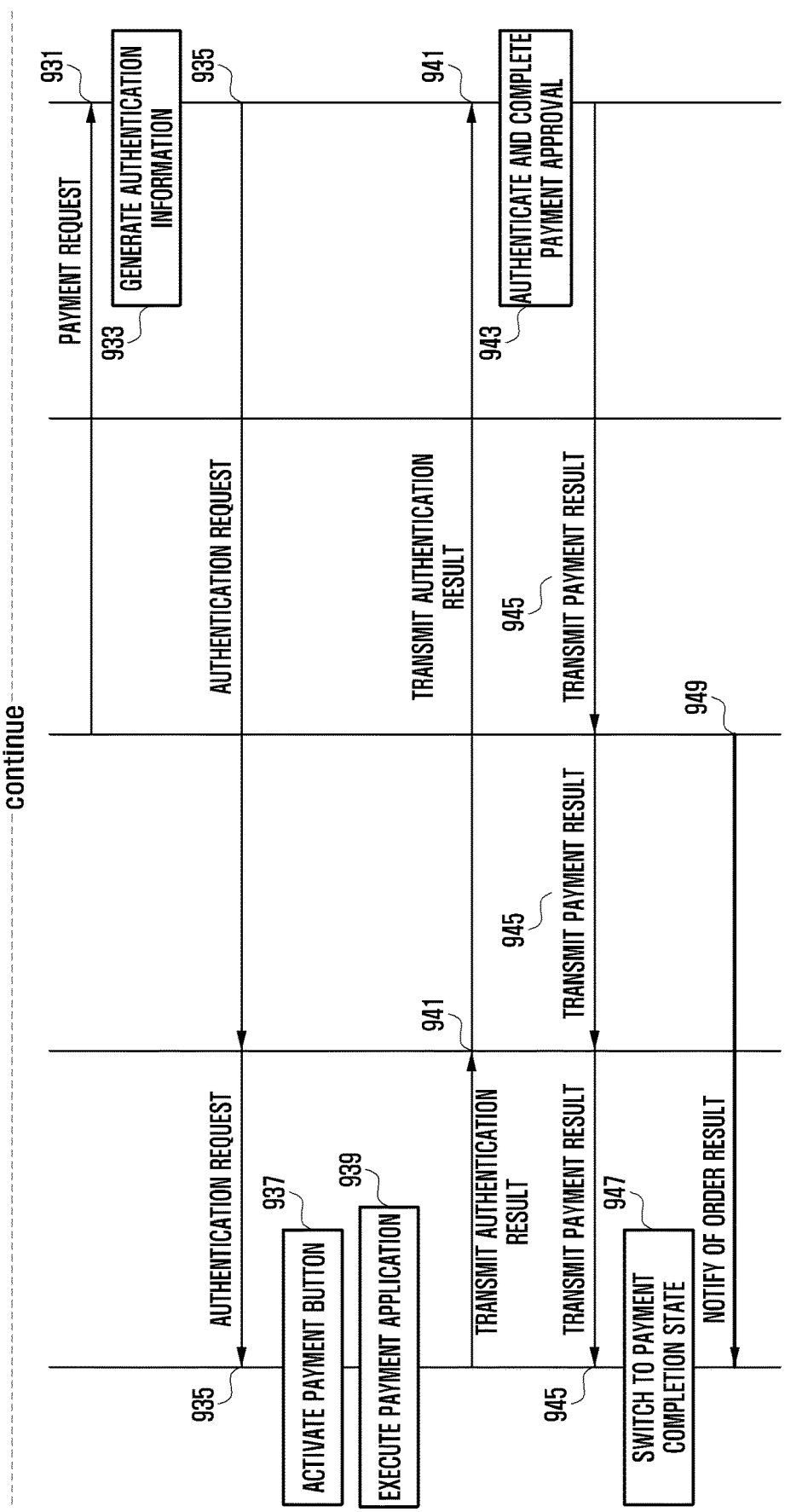

FIGS. 9A and 9B illustrate a signal flow between an electronic device and a server in a method of performing a product payment function according to various embodiments of the disclosure.

According to various embodiments of the disclosure, FIGS. 9A and 9B illustrate the case in which payment means information (for example, an account and a credit card) of a payment service is registered.

Referring to FIGS. 9A and 9B, according to various embodiments of the disclosure, a payment system may include an electronic device 901, a service server 903, a home shopping provider 905, a mobile carrier 907, and a payment server 909.

According to various embodiments of the disclosure, the electronic device 901 may detect an input of a phone number (for example, a phone number of the home shopping provider 905) of the service provider in a call application user interface in step 911. If the phone number is input, the electronic device 901 may transfer the phone number to the service server 903 in step 913. The service server 903 may be server that stores a phone number of the service provider, product information associated with the phone number, identification information of the electronic device, product information associated with the identification information of the electronic device, and information on whether the payment service is supported.

According to various embodiments of the disclosure, the electronic device 901 may make a request for a call connection to the phone number to the mobile carrier 907 in step 915.

According to various embodiments of the disclosure, the service server 903 may identify product information associated with the phone number received from the electronic device 901 in step 917 while the request for the call connection to the phone number is being made, and transfer the product information to the electronic device 901 in step 919. The service server 903 may further transfer information on whether the payment service is supported to the electronic device 901.

According to various embodiments of the disclosure, the electronic device 901 may display a button (for example, a payment button) on the call application user interface according to the product information and support of the payment service while the request for the call connection to the phone number is being made in step 921. The payment button may be in an inactive state and may be displayed to inform the user that the product can be paid for using the payment service (for example, Samsung Pay).

According to various embodiments of the disclosure, the mobile carrier 907 may control the call connection between the electronic device 901 and the home shopping provider 905 corresponding to the phone number in response to the request for the call connection received from the electronic device 901 as indicated by reference numeral 923.

According to various embodiments of the disclosure, after the call connection to the home shopping provider 905, the electronic device 901 may transfer identification information of the home shopping provider 905 and the electronic device 901, for example, phone numbers to the service server 903 as indicated by reference numeral 927.

According to various embodiments of the disclosure, although it has been described that the electronic device 901 transfers the identification information of the electronic device 901 to the service server 903 in operation 927, the disclosure is not limited thereto. For example, the identification information of the electronic device 901 may be transferred to the service server 903 together with the phone number of the service provider in operation 911. In this case, after identifying product information associated with the identification information of the electronic device 901, the service server 903 may perform an operation of transferring the product information to the electronic device 901.

According to various embodiments of the disclosure, upon receiving a signal for completion of a product order, the home shopping provider 905 may generate a transaction number and product price for the product information associated with the phone number as indicated by reference numeral 929. For example, the transaction number may be generated by a combination of at least one of identification information of the service provider, identification information of the user, and product information received from the electronic device 901. The product price may be amounts reflecting coupons and discounts of the product.

According to various embodiments of the disclosure, the home shopping provider 905 may make a request for payment for the product to the payment server 909 on the basis of payment information as indicated by reference numeral 931.

According to various embodiments of the disclosure, the payment server 909 may generate authentication information as indicated by reference numeral 933 and transfer an authentication request to the electronic device 901 through the service server 903 as indicated by reference numeral 935.

According to various embodiments of the disclosure, upon receiving the authentication request from the service server 903, the electronic device 901 may activate the payment button as indicated by reference numeral 937. For example, the payment button, which is in the inactive state in operation 921, may be switched to the active state and displayed to be selectable. As the payment button is switched to the active state to be selectable, a function of paying for the product may be performed using the payment service. For example, upon detecting an input for selecting the activated payment button, the electronic device 901 may execute a payment application as indicated by reference numeral 939.

According to various embodiments of the disclosure, the electronic device 901 may perform user authentication by the execution of the payment application and transfer the authentication result to the payment server 909 through the service server 903 as indicated by reference numeral 941.

According to various embodiments of the disclosure, the payment server 909 may complete authentication and payment approval on the basis of the authentication result received from the service server 903 as indicated by reference numeral 943 and transfer the payment result to the electronic device 901 through the home shopping provider 905 and the service server 903 as indicated by reference numeral 945.

According to various embodiments of the disclosure, upon receiving information on the payment result, for example, information on payment completion from the service server 903, the electronic device 901 may switch the payment button to a payment completion state and display the payment button as indicated by reference numeral 947.

According to various embodiments of the disclosure, upon receiving the payment result, for example, information on payment approval from the payment server 909, the home shopping provider 905 may notify the electronic device 901 of the order result, for example, final payment approval of the product as indicated by reference numeral 949.

According to various embodiments of the disclosure, information on operation 915, operation 923, and operation 949 is a voice signal and may be transmitted and received through a circuit network. Information on operations except for operation 915, operation 923, and operation 949 may be transmitted and received using at least one of a packet network and a VoIP.

Figure 10:
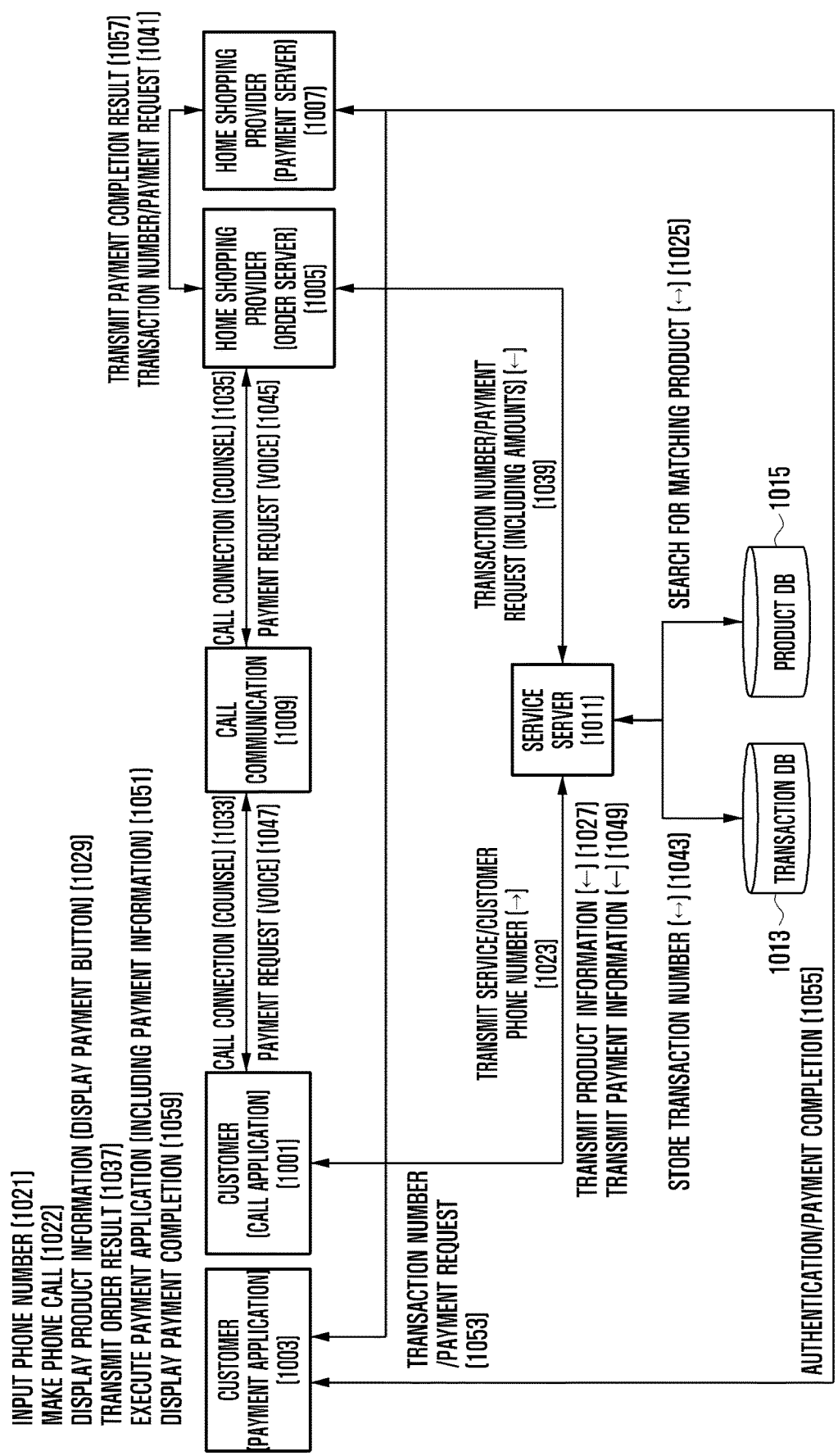
FIG. 10 is a block diagram illustrating a system for performing a product payment function according to various embodiments of the disclosure.

FIG. 10 is a block diagram illustrating a system for performing a product payment function according to various embodiments of the disclosure.

According to various embodiments of the disclosure, FIG. 10 illustrates an embodiment of the case in which payment means information (for example, an account or a credit card) of the payment service is registered.

Referring to FIG. 10, according to various embodiments of the disclosure, the electronic device may detect an input 1021 of a home shopping phone number by a customer 1001 through a call application user interface.

According to various embodiments of the disclosure, upon detecting a request for a call connection to the input phone number as indicated by reference numeral 1022, the electronic device 1001 may transfer the home shopping phone number and/or identification information of the user of the electronic device (for example, a phone number) to a service server 1011 as indicated by reference numeral 1023.

According to various embodiments of the disclosure, the service server 1011 may inquire about a product associated with the home shopping phone number in a product database (DB) 1015 while the request for the call connection is being made as indicated by reference numeral 1025. The service server 1011 may transfer product information found through the inquiry operation to the customer 1001 as indicated by reference numeral 1027.

According to various embodiments of the disclosure, the electronic device may display the product information received from the service server 1011 while the request for the call connection is being made as indicated by reference numeral 1029. The electronic device may display the product information and may further display an input button (for example, a payment button) associated with a payment application as indicated by reference numeral 1029.

According to various embodiments of the disclosure, the electronic device may make a phone call to the home shopping provider (order server) 1005 through call communication 1009. For example, the customer may talk to a representative to order the product as indicated by reference numerals 1033 and 1035.

According to various embodiments of the disclosure, the electronic device may transfer the order result to the home shopping provider (order server) 1005 as indicated by reference numeral 1037.

According to various embodiments of the disclosure, the home shopping provider (order server) 1005 may generate a transaction number, transfer the generated transaction number of the service server 1011, and make a request for payment for the product as indicated by reference numeral 1039.

According to various embodiments of the disclosure, the home shopping provider (order server) 1005 may make a request for payment to the home shopping (payment server) 1007 on the basis of the generated transaction number as indicated by reference numeral 1041.

According to various embodiments of the disclosure, a transaction database (DB) 1013 of the service server 1011 may store the transaction number generated by the home shopping provider (order server) 1005 as indicated by reference numeral 1043.

According to various embodiments of the disclosure, a payment request may be made between the electronic device and the home shopping provider (order server) 1005 through call communication 1009 as indicated by reference numerals 1045 and 1047.

According to various embodiments of the disclosure, the service server 1011 may transfer payment information to the customer 1001 as indicated by reference numeral 1049.

According to various embodiments of the disclosure, upon detecting an input for selecting an input button (for example, a payment button), the electronic device may execute a payment application as indicated by reference numeral 1051. The electronic device may make a request for payment for the ordered product to the home shopping provider (payment server) 1007 as indicated by reference numeral 1053.

According to various embodiments of the disclosure, the customer 1003 may perform authentication through a payment application user interface displayed by execution of the payment application. For example, the electronic device may perform authentication using an authentication code or biometric recognition (for example, fingerprint scan through a fingerprint sensor or iris recognition) generated at a specific time (for example, a payment time or a preset time).

According to various embodiments of the disclosure, the home shopping provider (payment server) 1007 may complete payment for the ordered product on the basis of the authentication result received from the electronic device (for example, the customer (payment application 1003)) as indicated by reference numeral 1055. The home shopping provider (payment server) 1007 may transfer the payment completion result of the ordered product to the home shopping provider (order server) 1005 as indicated by reference numeral 1057.

According to various embodiments of the disclosure, the electronic device may display completion of payment for the ordered product on the basis of payment approval of the ordered product by the home shopping provider (payment server) 1007 as indicated by reference numeral 1059.

Figure 11A:
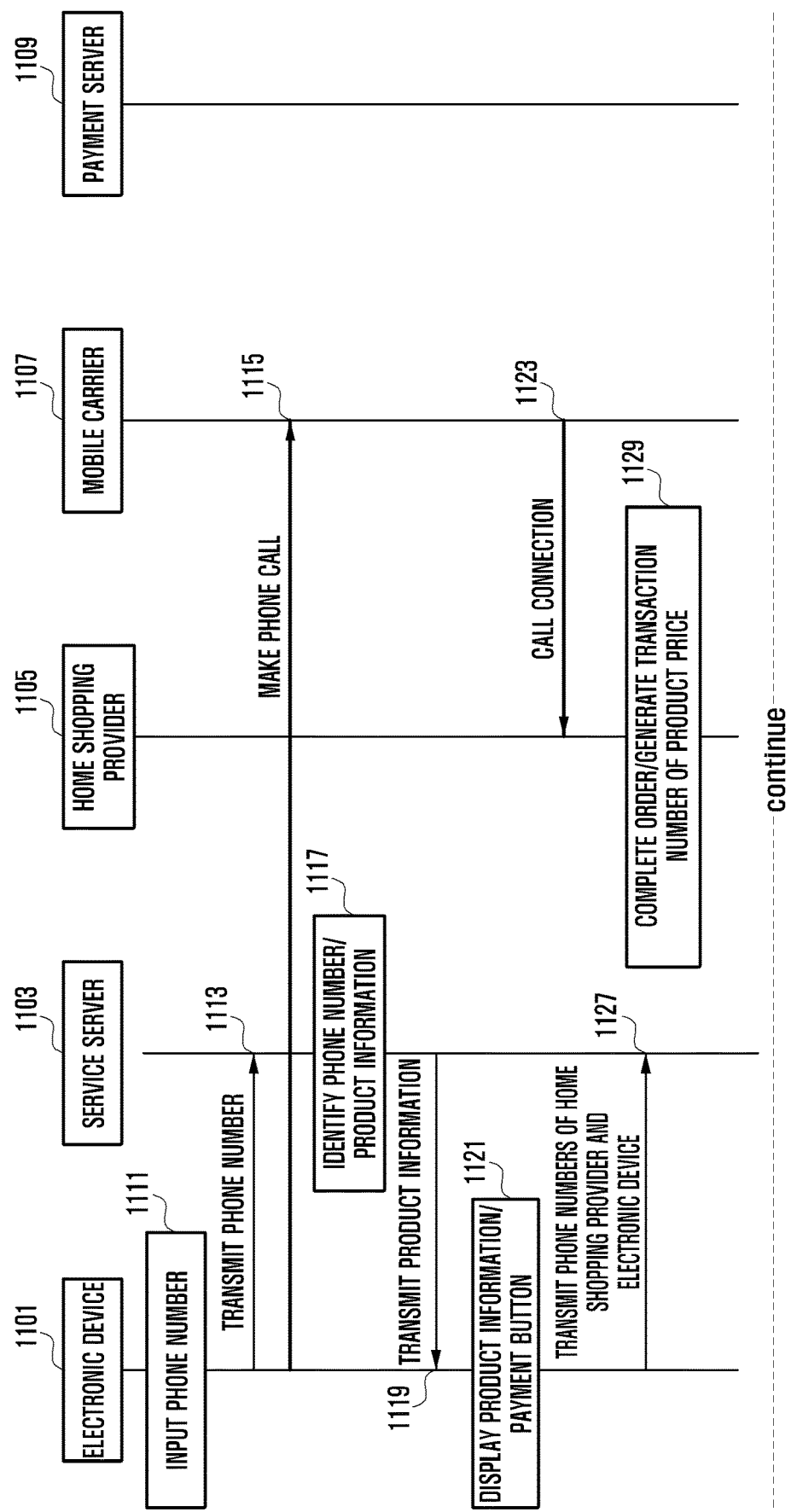
FIGS. 11A and 11B illustrate a signal flow between an electronic device and a server in a method of performing a product payment function according to various embodiments of the disclosure.
Figure 11B:
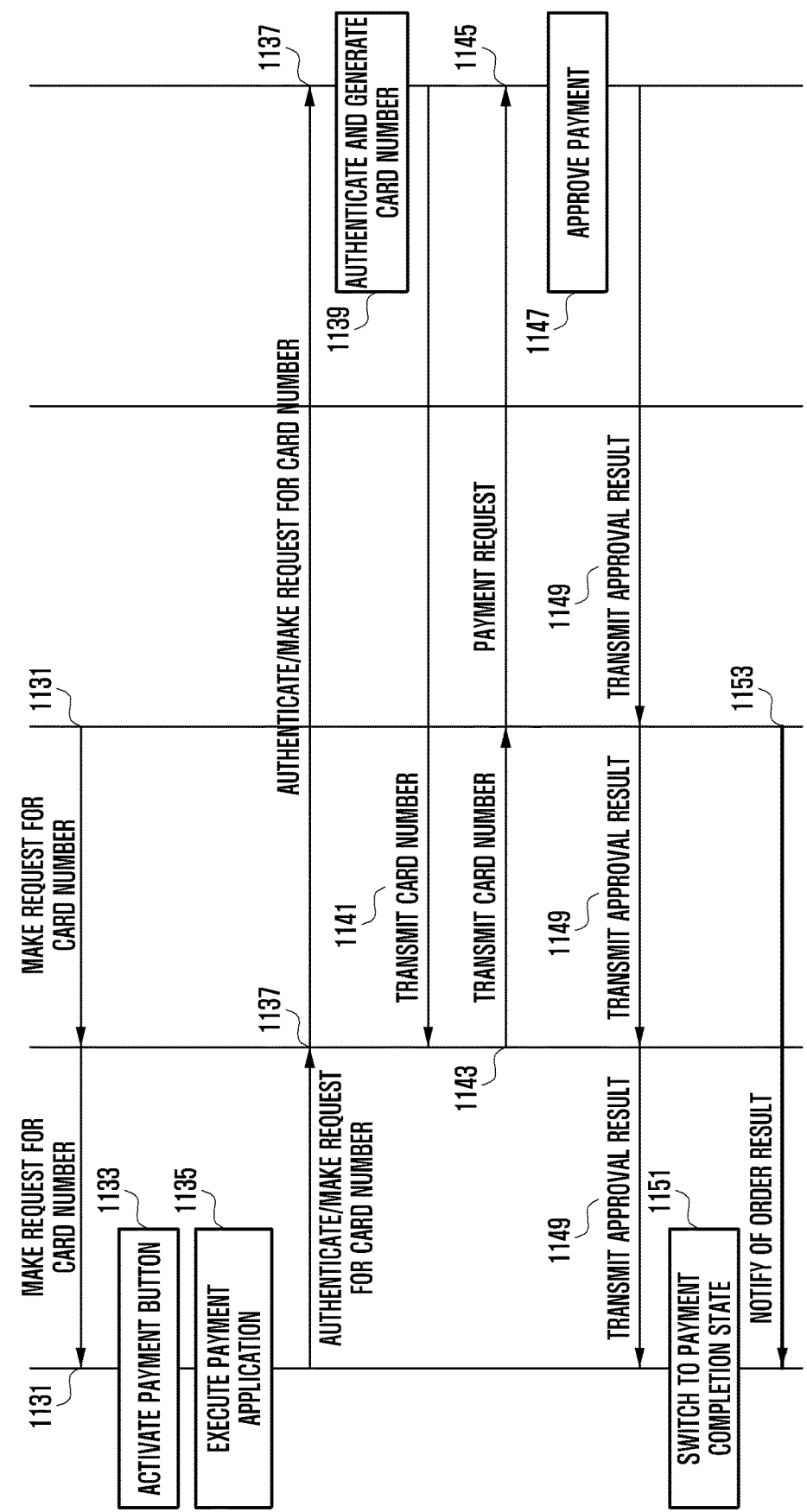

FIGS. 11A and 11B illustrate a signal flow between an electronic device and a server in a method of performing a product payment function according to various embodiments of the disclosure.

According to various embodiments of the disclosure, FIGS. 11A and 11B illustrate an embodiment of the case in which payment means information of a payment service is not registered unlike FIGS. 9A and 9B.

Referring to FIGS. 11A and 11B, according to various embodiments of the disclosure, a payment system may include an electronic device 1101, a service server 1103, a home shopping provider 1105, a mobile carrier 1107, and a payment server 1109.

According to various embodiments of the disclosure, since operations 1111 to 1129 of FIG. 11A are the same as operations 911 to 929 of FIG. 9A, a description thereof is replaced with the description of FIG. 9A. Hereinafter, in FIGS. 11A and 11B, only operations different from those of FIGS. 9A and 9B will be described.

According to various embodiments of the disclosure, upon receiving a signal for product order completion, the home shopping provider 1105 may generate payment information 1129 on the basis of a transaction number of product information associated with a phone number of a service provider and product price.

According to various embodiments of the disclosure, the home shopping provider 1105 may make a request for information for payment for the product, for example, a card number to the electronic device 1101 through the service server 1103 as indicated by reference numeral 1131. Upon receiving the request for the card number, the electronic device 1101 may activate a payment button as indicated by reference numeral 1133 and, upon receiving an input for selecting the payment button, execute the payment application as indicated by reference numeral 1135.

According to various embodiments of the disclosure, the electronic device 1101 may perform authentication through a payment application user interface displayed by execution of the payment application and make a request for the authentication result and the card number to the payment server 1109 through the service server 1103 as indicated by reference numeral 1137.

According to various embodiments of the disclosure, the payment server 1109 may generate the card number on the basis of the authentication result as indicated by reference numeral 1139. The payment server 1109 may transfer the generated card number to the home shopping provider 1105 through the service server 1103 as indicated by reference numerals 1141 and 1143.

According to various embodiments of the disclosure, the service server 1103 may make a request for payment for the ordered product to the payment server 1109 as indicated by reference numeral 1145. The payment server 1109 may approve the payment in response to the payment request received from the service server 1103 as indicated by reference numeral 1147 and transfer the approval result to the electronic device 1101 through the home shopping provider 1105 and the service server 1103 as indicated by reference numeral 1149.

According to various embodiments of the disclosure, the electronic device 1101 may switch the payment button to a payment completion state and display the payment button as indicated by reference numeral 1151.

According to various embodiments of the disclosure, if the payment based on payment information is approved, the home shopping provider 1105 may notify the electronic device 1101 of final payment approval of the product as indicated by reference numeral 1153.

According to various embodiments of the disclosure, information on operation 1115, operation 1123, and operation 1153 is a voice signal and may be transmitted and received through a circuit network. Information on operations except for operation 1115, operation 1123, and operation 1153 may be transmitted and received using at least one of a packet network and a VoIP.

Figure 12:
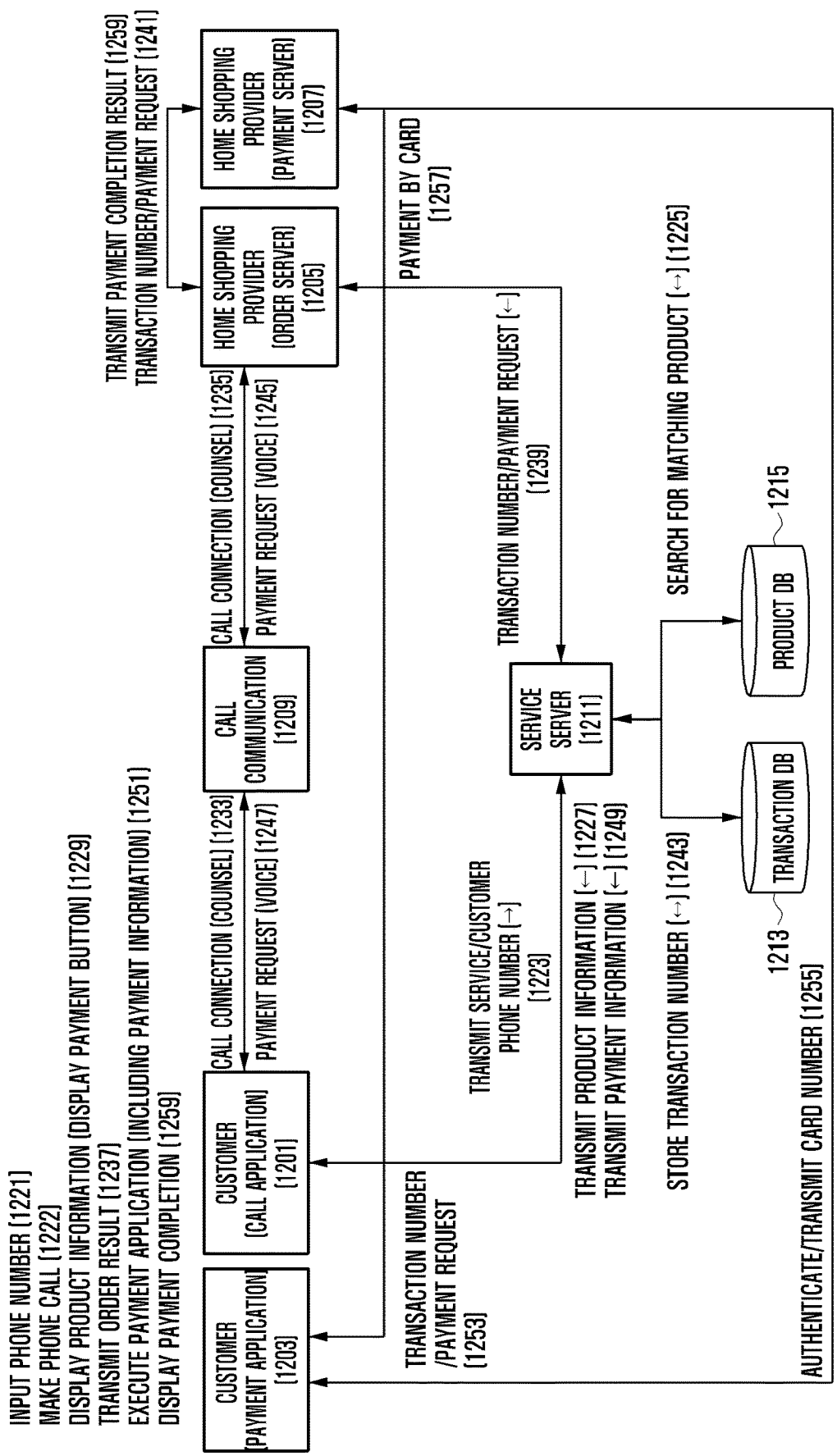
FIG. 12 is a block diagram illustrating a system for performing a product payment function according to various embodiments of the disclosure.

FIG. 12 is a block diagram illustrating a system for performing a product payment function according to various embodiments of the disclosure.

According to various embodiments of the disclosure, FIG. 12 illustrates an embodiment of the case in which payment means information of a payment service is not registered.

According to various embodiments of the disclosure, since operations 1221 to 1255 and operation 1259 of FIG. 12 are the same as operations 1021 to 1053 and operation 1059 of FIG. 10, a detailed description thereof is replaced with the description of FIG. 10. Hereinafter, in FIG. 12, only operations different from those of FIG. 10 will be described.

Referring to FIG. 12, according to various embodiments of the disclosure, upon detecting an input for selecting a button, for example, a payment button, the electronic device may execute a payment application as indicated by reference numeral 1251 and make a request for payment for the ordered product to the home shopping provider (payment server) 1207 as indicated by reference numeral 1253.

According to various embodiments of the disclosure, the home shopping provider (payment server) 1207 may transfer authentication and a card number to a customer (payment application) as indicated by reference numeral 1255 and perform card payment for the ordered product on the basis thereof as indicated by reference numeral 1257.

Figure 13A:
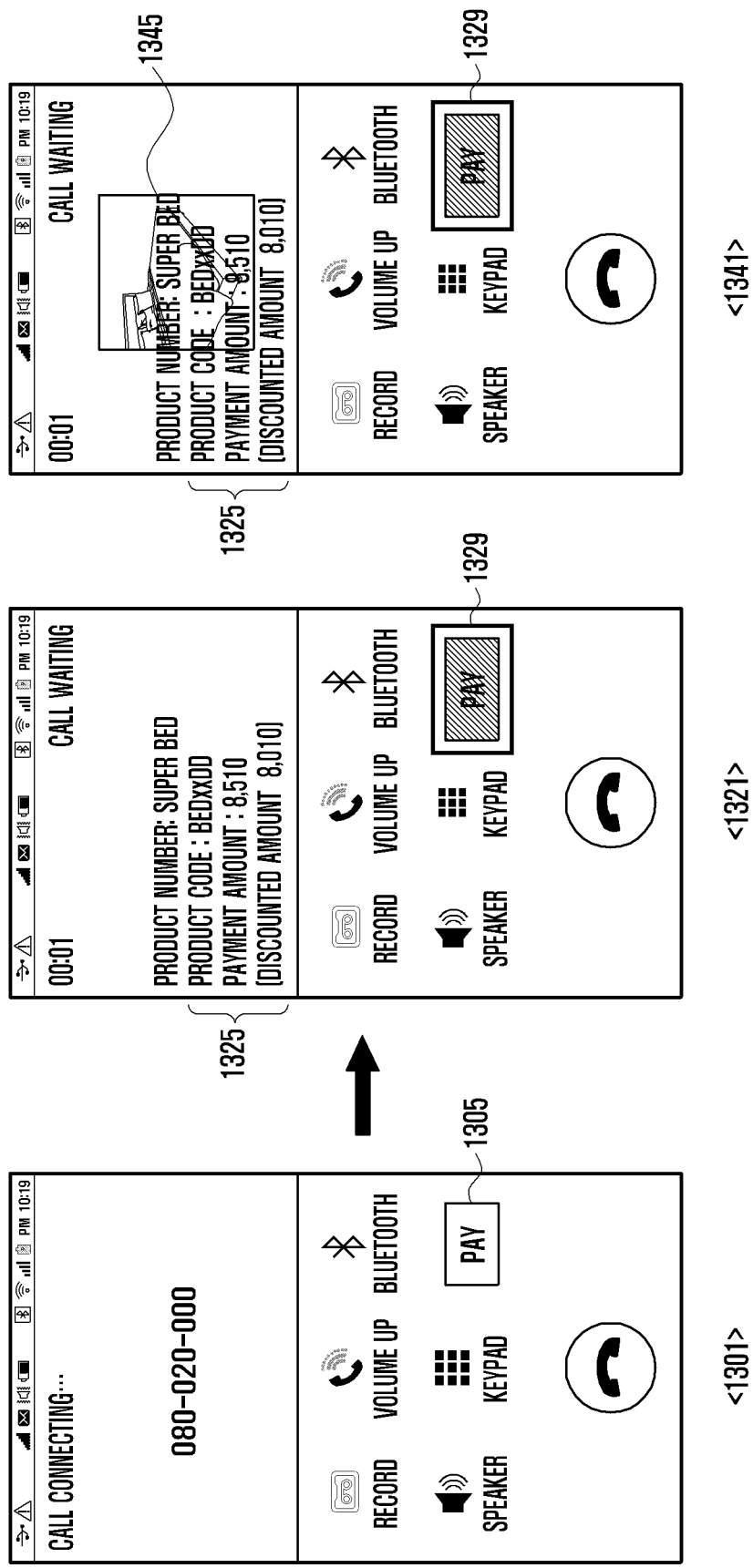
FIGS. 13A and 13B illustrate a method of performing a product payment function by an electronic device according to various embodiments of the disclosure.
Figure 13B:
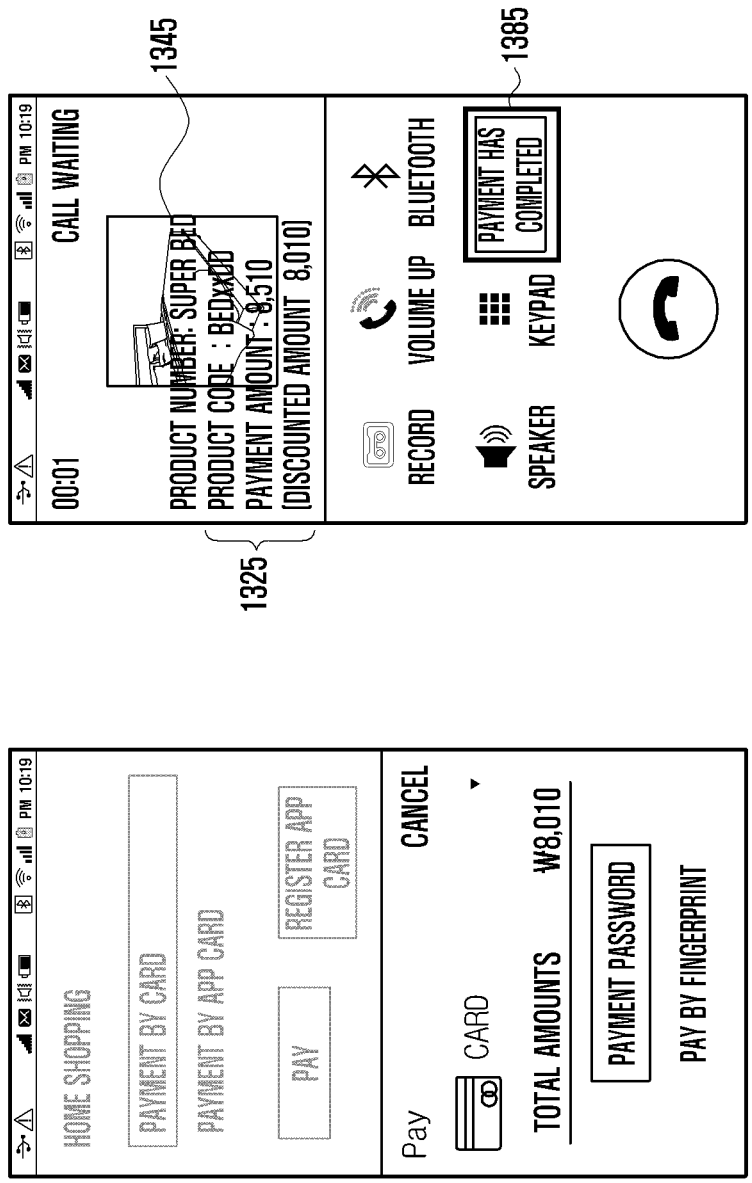

FIGS. 13A and 13B illustrate a method of performing a product payment function by an electronic device according to various embodiments of the disclosure.

Referring to FIG. 13A, an electronic device (for example, the electronic device 400 of FIG. 4) may detect an input of a home shopping phone number (for example, 080-020-000) through a call application user interface as indicated by reference numeral 1301. The electronic device may detect a request for a call connection to the home shopping phone number.

According to various embodiments of the disclosure, if a product payment function can be performed using a payment service, to which the electronic device subscribes, in the home shopping, the electronic device may display a button 1305 associated with a payment application on the call application user interface while the request for the call connection to the home shopping phone number is being made. At this time, the button 1305 is only to inform the user that the payment function can be performed, and may be in an inactive state.

According to various embodiments of the disclosure, although not illustrated in reference numeral 1301, information 1325 and 1345 on the product (for example, a product name, a product code, payment amounts, discount amounts, and product image information) may be further displayed on the call application user interface as indicated by reference numerals 1321 and 1341.

If the order of the product is completed through the call connection to the home shopping, the electronic device may switch a button 1329 to an active state according to support of the payment service and display the button together with the information 1325 and 1345 on the product as indicated by reference numerals 1321 and 1341.

Upon detecting an input for selecting the payment button 1329 switched to the active state, the electronic device may execute the payment application and perform the product payment function through authentication using the payment means (for example, a fingerprint) registered in the payment service as indicated by reference numeral 1361 of FIG. 13B.

When the payment is completed, the electronic device may display a button 1385 switched to a payment completion state as indicated by reference numeral 1381.

Figure 14A:
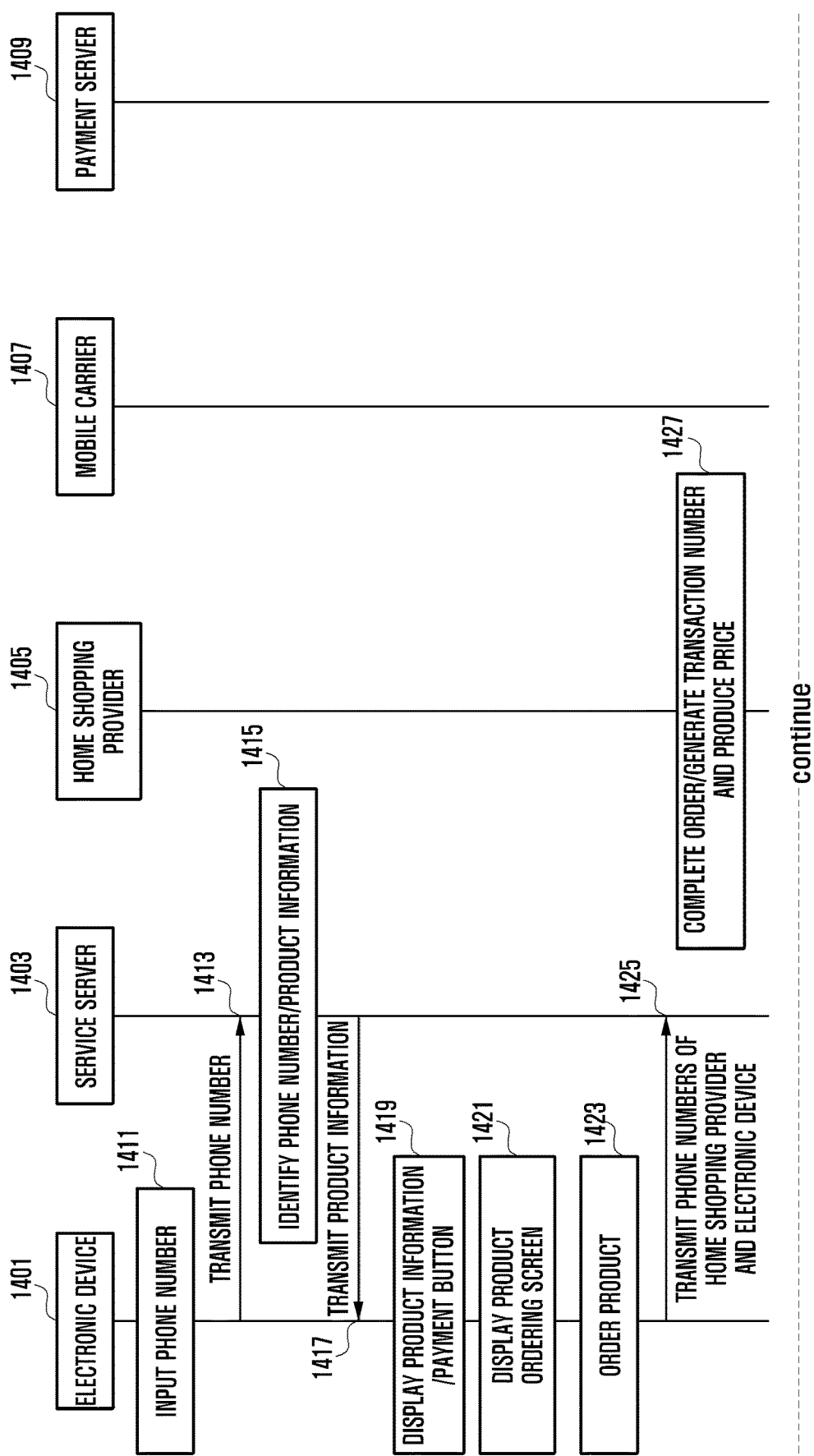
FIGS. 14A and 14B illustrate a signal flow between an electronic device and a server in a method of performing a product payment function according to various embodiments of the disclosure.
Figure 14B:
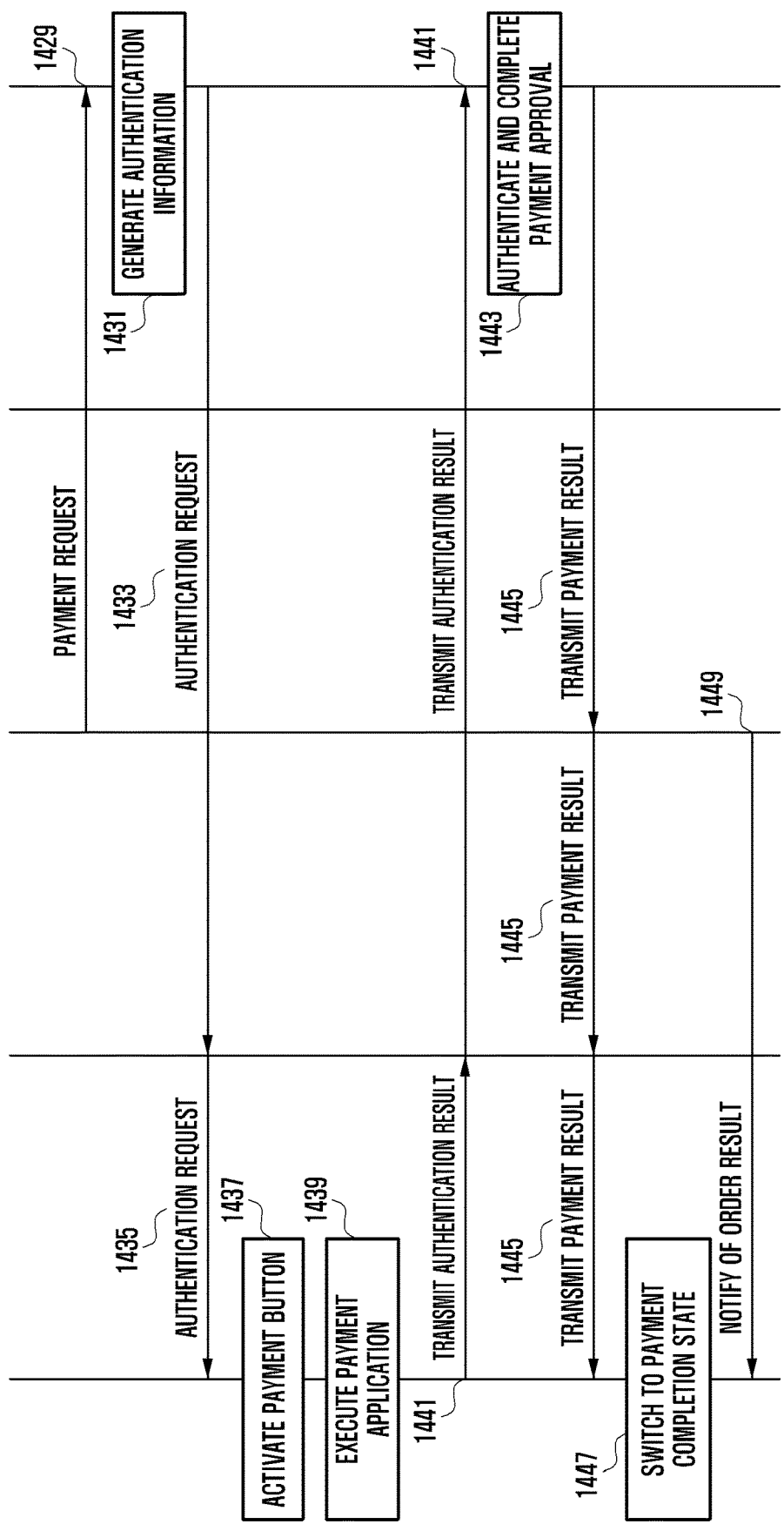

FIGS. 14A and 14B illustrate a signal flow between an electronic device and a server in a method of performing a product payment function according to various embodiments of the disclosure.

According to various embodiments of the disclosure, FIGS. 14A and 14B illustrate an embodiment of a method of ordering a product according to a product ordering method.

Referring to FIGS. 14A and 14B, according to various embodiments of the disclosure, a payment system may include an electronic device 1401, a service server 1403, a home shopping provider 1405, a mobile carrier 1407, and a payment server 1409.

According to various embodiments of the disclosure, since operations 1411 to 1419 of FIG. 14A are the same as operations 911 to 919 of FIG. 9A, a description thereof is replaced with the description of FIG. 9A. Hereinafter, in FIGS. 14A and 14B, only operations different from those of FIGS. 9A and 9B will be described.

The electronic device 1401 may display a button (for example, a payment button) according to product information and support of a payment service on a call application user interface as indicated by reference numeral 1419.

According to various embodiments of the disclosure, the call application user interface may further include at least one object for selecting a product ordering method. The electronic device 1401 may order the product in different ways according to the selection result of the product ordering method. For example, at least one object may include a first object for ordering a product through a phone call (for example, through a representative or an ARS) and a second object for ordering a product through a separate user interface.

According to various embodiments of the disclosure, the electronic device 1401 may detect an input for ordering the product through the call application user interface. For example, the input for ordering the product may include a user input for selecting one of a first object and a second object detected in the call application user interface. According to various embodiments of the disclosure, the electronic device 1401 may perform the product ordering method corresponding to the first or second object of which the input is detected.

According to various embodiments of the disclosure, upon detecting selection of the first object for ordering the product through a call connection, the electronic device 1401 may perform an operation for ordering the product according to the call connection to a phone number of a service provider. For example, the user of the electronic device may order the product through the connection to a representative or using a keypad after an ARS connection.

According to various embodiments of the disclosure, upon detecting selection of the second object for ordering the product through a separate user interface, the electronic device 1401 may display a product ordering screen including at least one of a product name, a product identification number, product image information, product price, discount information, coupon information, information on the number of products, and destination information as indicated by reference numeral 1421. The user of the electronic device may order the product through the product ordering screen.

If the product order is completed as indicated by reference numeral 1423, the electronic device 1401 may transfer identification information of the home shopping provider 1405 and the electronic device 1401, for example, phone numbers to the service server 1403 as indicated by reference numeral 1425.

According to various embodiments of the disclosure, since operation 1425 of FIG. 14A to operation 1449 of FIG. 14B are the same as operation 927 of FIG. 9A to operation 949 of FIG. 9B, a description thereof is replaced with the description of FIGS. 9A and 9B.

According to various embodiments of the disclosure, the following payment can be performed using the electronic device. Hereinafter, various use examples of the electronic device according to the disclosure will be described.

According to various embodiments of the disclosure, when utility fees are paid, identification information (for example, phone numbers) of a utility bill issuing institution and an electronic device is transmitted to a service server through an input of a phone number of the utility bill issuing institution, and utility fee information associated with the identification information of the utility bill issuing institution and the electronic device may be received from the service server. The utility fee information may be stored in the service server for each piece of identification information of the user of the electronic device. In other words, the electronic device may receive utility fee information reflecting payment amounts different for each electronic device by transmitting identification information of the electronic device to the service server. According to various embodiments of the disclosure, by allocating different payment numbers to electronic devices through one representative number, an unnecessarily large quantity of numbers may not be needed unlike the prior art allocating payment numbers to electronic devices as representative numbers.

According to various embodiments of the disclosure, the service server may have discount events (for example, discount for preferred customers, promotion in each region, and customized discount services (for example, providing events to a customer using a specific number) on the basis of the identification information of the user of the electronic device and provide users with payment amounts reflecting the discount.

According to various embodiments of the disclosure, the service server may store a base price for each piece of identification information of the user of the electronic device in a database. Further, the service server may designate and store discount information for each piece of identification information of the user of the electronic device (for example, discount for early payment of utility fees, additional charges for payment after a due date, the number of purchases of products, and the number of phone calls).

According to various embodiments of the disclosure, the electronic device and the payment method using the same have been described by way of exemplary embodiments through this specification and drawings and specific terms have been used, but these are used as general meanings only to easily describe the technology of the disclosure and to help understanding of the disclosure and thus the disclosure is not limited to the embodiments. That is, it will be apparent to those skilled in the art that various embodiments may be implemented based on the technical idea of the disclosure.

The invention claimed is:

1. An electronic device comprising:
a housing:
a touch screen display exposed through a portion of the housing;
at least one wireless communication circuit positioned inside the housing;
a processor positioned inside the housing and electrically connected to the touch screen display and the wireless communication circuit; and
a memory positioned inside the housing, electrically connected to the processor,
wherein the memory stores a call application including a first user interface and a payment application including a second user interface, and
wherein the memory stores instructions that, when executed, cause the processor to:
display the first user interface of the call application on the touch screen display,
receive a phone number or an indication of the phone number through the first user interface from a user,
make a request for a call connection to the phone number through the wireless communication circuit,
receive data associated with the phone number from a first server through the wireless communication circuit while the request for the call connection is being made, the data including a currently available item for a selected period, display the item on the first user interface while the request for the call connection is being made,
display an input button associated with the payment application on the first user interface while the request for the call connection is being made,
receive an input for selecting the input button through the first user interface, and
execute the payment application.

2. The electronic device of claim 1, wherein the instructions, when executed, further cause the processor to, if the indication of the phone number is received, transmit identification information of the user of the electronic device to the first server through the wireless communication circuit and receive data associated with the phone number and the identification information of the user of the electronic device from the first server through the wireless communication circuit.

3. The electronic device of claim 1, wherein the instructions, when executed, further cause the processor to detect an input for ordering the item and, if the order of the item is completed, receive payment information required for payment for the ordered item from a second server through the wireless communication circuit.

4. The electronic device of claim 3, wherein the instructions, when executed, further cause the processor to, if the payment information required for payment for the ordered item is received, switch the input button in an inactive state to an activate state in which the input button can be selected and display the input button on the first user interface.

5. The electronic device of claim 4, wherein the instructions, when executed, further cause the processor to determine whether payment means information is registered in the payment application, if the payment means information is registered, acquire user authentication information in order to perform a payment function of the item, transmit the acquired user authentication information to the second server through the wireless communication circuit, make a request for payment for the item, receive a payment result based on the user authentication information from the second server through the wireless communication circuit, and display the payment result on the first user interface.

6. The electronic device of claim 5, wherein the instructions, when executed, further cause the processor to, if the payment means information is not registered in the payment application, acquire user authentication information, transmit the acquired user authentication information to the second server through the wireless communication circuit, make a request for the payment means information, and receive a payment result based on the requested payment means information from the second server through the wireless communication circuit.

7. The electronic device of claim 1, wherein the instructions, when executed, further cause the processor to display the data including at least one of a name of the currently available item associated with the phone number, an item identification number, item image information, price information, discount information, or coupon information on the first user interface.

8. An electronic device comprising:
a housing;
a touch screen display exposed through a portion of the housing;
at least one wireless communication circuit positioned inside the housing;
a processor positioned inside the housing and electrically connected to the touch screen display and the wireless communication circuit; and
a memory positioned inside the housing, electrically connected to the processor,
wherein the memory stores a call application including a first user interface and a payment application including a second user interface, and
wherein the memory stores instructions that, when executed, cause the processor to:
display the first user interface of the call application on the touch screen display,
receive an input of a phone number through the first user interface, display a currently available item, an input button associated with the payment application, and at least one object for a method to order the item on the first user interface, and
if an input for selecting the input button is received through the first user interface, execute the payment application,
display at least one object to order the item, including a first object for making a request for a call connection with the phone number and a second object for displaying an item order screen on the first user interface,
make the request for the call connection to the phone number through the one wireless communication circuit if the first object is selected and display the item order screen on the touch screen display if the second object is selected, and
execute the payment application if the order of the item is completed in the item order screen and an input for selecting the input button is received through the first user interface.

9. A method of performing payment by an electronic device, the method comprising:
displaying a first user interface of a call application on a touch screen display;
receiving a phone number or an indication of the phone number through the first user interface;
making a request for a call connection to the phone number;
receiving data associated with the phone number including a currently available item for a selected period from a first server while the request for the call connection is being made;
displaying the item and an input button associated with a payment application on the first user interface while the request for the call connection is being made; and
if an input for selecting the input button is received through the first user interface, executing the payment application.

10. The method of claim 9, further comprising, if the indication of the phone number is received, transmitting identification information of the user of the electronic device to the first server, wherein the receiving of the data comprises receiving data associated with the phone number and the identification information of the user of the electronic device from the first server.

11. The method of claim 9, wherein the displaying of the input button further comprises:
detecting an input for ordering the item; and
if the order of the item is completed, receiving payment information required for payment for the ordered item from a second server.

12. The method of claim 11, wherein the input button is in an inactive state, and if the payment information required for payment for the ordered item is received, the input button in the inactive state is switched to an active state, in which the input button can be selected, and displayed.

13. The method of claim 12, further comprising:
determining whether payment means information is registered in the payment application;
if the payment means information is registered, acquiring user authentication information in order to perform a payment function of the item;
transmitting the acquired user authentication information to the second server and making a request for payment for the item; and
receiving a payment result based on the user authentication information from the second server and displaying the payment result.

14. The method of claim 13, further comprising:
if the payment means information is not registered in the payment application, acquiring user authentication information;
transmitting the acquired user authentication information to the second server and making a request for the payment means information; and
receiving a payment result based on the requested payment means information from the second server.

* * * * *